US009779760B1

(12) United States Patent
Ouimette et al.

(10) Patent No.: US 9,779,760 B1
(45) Date of Patent: Oct. 3, 2017

(54) ARCHITECTURE FOR PROCESSING REAL TIME EVENT NOTIFICATIONS FROM A SPEECH ANALYTICS SYSTEM

(71) Applicant: Noble Systems Corporation, Atlanta, GA (US)

(72) Inventors: Jason P. Ouimette, Atlanta, GA (US); Karl H. Koster, Sandy Springs, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 423 days.

(21) Appl. No.: 14/080,912

(22) Filed: Nov. 15, 2013

(51) Int. Cl.
*H04M 3/00* (2006.01)
*H04M 5/00* (2006.01)
*G10L 25/48* (2013.01)
*H04M 3/51* (2006.01)

(52) U.S. Cl.
CPC .......... *G10L 25/48* (2013.01); *H04M 3/5166* (2013.01)

(58) Field of Classification Search
CPC .............................................. H04M 3/42221
USPC ............. 379/265.02, 265.06, 265.07, 265.12
See application file for complete search history.

(56) References Cited

U.S. PATENT DOCUMENTS

| 5,267,305 | A | 11/1993 | Prohs et al. |
| 5,270,920 | A | 12/1993 | Pearse et al. |
| 6,157,808 | A | 12/2000 | Hollingsworth et al. |
| 6,356,634 | B1 | 3/2002 | Noble, Jr. |
| 6,721,416 | B1* | 4/2004 | Farrell ............ H04M 3/51 379/265.07 |
| 6,862,343 | B1 | 3/2005 | Vacek et al. |
| 7,133,828 | B2 | 11/2006 | Scarano et al. |
| 7,542,902 | B2 | 6/2009 | Scahill et al. |
| 7,548,539 | B2 | 6/2009 | Kouretas et al. |
| 7,574,000 | B2 | 8/2009 | Blair |
| 7,672,845 | B2 | 3/2010 | Beranek et al. |
| 7,752,043 | B2 | 7/2010 | Watson |
| 7,930,179 | B1 | 4/2011 | Gorin et al. |
| 7,974,411 | B2 | 7/2011 | Krishnapuram et al. |
| 8,078,470 | B2 | 12/2011 | Levanon et al. |
| 8,094,790 | B2 | 1/2012 | Conway et al. |
| 8,094,803 | B2 | 1/2012 | Danson et al. |

(Continued)

OTHER PUBLICATIONS

Office Action Received for U.S. Appl. No. 14/230,463 dated Jan. 14, 2016.

(Continued)

*Primary Examiner* — Nafiz E Hoque

(57) ABSTRACT

An architecture is provided for handling event notifications generated by a speech analytics module ("SAM") that recognizes keywords present in the audio of a call between an agent in a contact center and a remote party. In one embodiment, an event handler module receives and forwards the event notifications to various application specific modules ("ASMs"). The forwarding process may vary on the content and/or type of event notification received. Each ASM performs the processing for a particular audio context and may generate call instance data that pertains to the audio context and indicates whether the agent complied with various requirements during the call. The call instance data may be stored in a file for evaluating the agent's performance. The ASM may also perform other actions as appropriate, such as providing visual indicators on the agent's computer desktop or notify the agent's supervisor.

19 Claims, 14 Drawing Sheets

(56) References Cited

U.S. PATENT DOCUMENTS

| | | | |
|---|---|---|---|
| 8,155,297 B1 | 4/2012 | Dhir et al. | |
| 8,175,007 B2 | 5/2012 | Jain et al. | |
| 8,180,643 B1 | 5/2012 | Pettay et al. | |
| 8,204,180 B1 | 6/2012 | Narayanan et al. | |
| 8,209,182 B2 | 6/2012 | Narayanan | |
| 8,219,401 B1* | 7/2012 | Pettay | G10L 15/26 704/270 |
| 8,249,875 B2 | 8/2012 | Levanon et al. | |
| 8,275,115 B1 | 9/2012 | Everingham et al. | |
| 8,396,205 B1 | 3/2013 | Lowry et al. | |
| 8,396,732 B1 | 3/2013 | Nies et al. | |
| 8,401,155 B1 | 3/2013 | Barnes et al. | |
| 8,422,641 B2 | 4/2013 | Martin, II | |
| 8,463,606 B2 | 6/2013 | Scott et al. | |
| 8,504,371 B1 | 8/2013 | Vacek et al. | |
| 8,531,501 B2 | 9/2013 | Portman et al. | |
| 8,649,499 B1 | 2/2014 | Koster et al. | |
| 8,761,376 B2 | 6/2014 | Pande et al. | |
| 8,767,948 B1 | 7/2014 | Riahi et al. | |
| 8,781,092 B2 | 7/2014 | Noble, Jr. | |
| 8,949,128 B2 | 2/2015 | Meyer et al. | |
| 9,014,364 B1 | 4/2015 | Koster et al. | |
| 9,191,508 B1 | 11/2015 | Mekonnen et al. | |
| 9,225,833 B1 | 12/2015 | Koster et al. | |
| 9,299,343 B1 | 3/2016 | Koster et al. | |
| 9,307,084 B1 | 4/2016 | Pycko et al. | |
| 9,350,866 B1 | 5/2016 | Mekonnen et al. | |
| 9,407,758 B1 | 8/2016 | Pycko et al. | |
| 9,438,730 B1 | 9/2016 | Lillard et al. | |
| 9,456,083 B1 | 9/2016 | Ouimette | |
| 9,473,634 B1 | 10/2016 | Ouimette et al. | |
| 2003/0002651 A1 | 1/2003 | Shires | |
| 2003/0154120 A1 | 8/2003 | Freishtat et al. | |
| 2004/0008828 A1 | 1/2004 | Coles et al. | |
| 2004/0249650 A1 | 12/2004 | Freedman et al. | |
| 2005/0238161 A1 | 10/2005 | Yacoub et al. | |
| 2005/0283475 A1 | 12/2005 | Beranek et al. | |
| 2005/0286705 A1 | 12/2005 | Contolini et al. | |
| 2005/0286706 A1 | 12/2005 | Fuller | |
| 2006/0050658 A1 | 3/2006 | Shaffer et al. | |
| 2006/0111953 A1 | 5/2006 | Setya | |
| 2006/0233346 A1 | 10/2006 | McIlwaine et al. | |
| 2006/0256954 A1 | 11/2006 | Patel et al. | |
| 2006/0259473 A1 | 11/2006 | Li et al. | |
| 2006/0262919 A1 | 11/2006 | Danson et al. | |
| 2006/0265090 A1 | 11/2006 | Conway et al. | |
| 2007/0088563 A1 | 4/2007 | Nardotti, Jr. et al. | |
| 2007/0111180 A1 | 5/2007 | Sperle et al. | |
| 2007/0160054 A1 | 7/2007 | Shaffer et al. | |
| 2007/0198330 A1 | 8/2007 | Korenblit et al. | |
| 2007/0280211 A1 | 12/2007 | Malueg et al. | |
| 2007/0280460 A1 | 12/2007 | Harris et al. | |
| 2008/0002823 A1 | 1/2008 | Fama et al. | |
| 2008/0027785 A1 | 1/2008 | Mechaley et al. | |
| 2008/0037719 A1 | 2/2008 | Doren | |
| 2008/0082330 A1 | 4/2008 | Blair | |
| 2008/0240376 A1 | 10/2008 | Conway et al. | |
| 2008/0270123 A1 | 10/2008 | Levanon et al. | |
| 2009/0157449 A1 | 6/2009 | Itani et al. | |
| 2009/0295536 A1 | 12/2009 | Doren | |
| 2010/0036670 A1 | 2/2010 | Hill et al. | |
| 2010/0082342 A1 | 4/2010 | Erhart et al. | |
| 2010/0104086 A1 | 4/2010 | Park | |
| 2010/0138411 A1 | 6/2010 | Judy et al. | |
| 2010/0158237 A1 | 6/2010 | McCormack et al. | |
| 2010/0161990 A1 | 6/2010 | Statham et al. | |
| 2011/0010173 A1 | 1/2011 | Scott et al. | |
| 2011/0026688 A1 | 2/2011 | Simpson | |
| 2011/0033036 A1 | 2/2011 | Edwards et al. | |
| 2011/0125499 A1 | 5/2011 | Griggs et al. | |
| 2011/0145093 A1 | 6/2011 | Paradise et al. | |
| 2011/0202344 A1 | 8/2011 | Meyer et al. | |
| 2011/0218798 A1 | 9/2011 | Gavalda | |
| 2011/0228919 A1 | 9/2011 | Tew et al. | |
| 2011/0307258 A1 | 12/2011 | Liberman et al. | |
| 2011/0317828 A1 | 12/2011 | Corfield | |
| 2012/0045043 A1 | 2/2012 | Timpson | |
| 2012/0140911 A1 | 6/2012 | Johansen et al. | |
| 2012/0263285 A1 | 10/2012 | Rajakumar et al. | |
| 2013/0003943 A1 | 1/2013 | Munns et al. | |
| 2013/0129069 A1 | 5/2013 | Peterson | |
| 2013/0246053 A1 | 9/2013 | Scott et al. | |
| 2014/0100848 A1 | 4/2014 | Shaffer et al. | |
| 2014/0140496 A1* | 5/2014 | Ripa | H04M 3/5133 379/265.06 |
| 2014/0140497 A1 | 5/2014 | Ripa et al. | |
| 2014/0163960 A1 | 6/2014 | Dimitriadis et al. | |
| 2014/0241519 A1 | 8/2014 | Watson et al. | |
| 2014/0257820 A1 | 9/2014 | Laperdon et al. | |
| 2014/0379525 A1 | 12/2014 | Timem et al. | |
| 2015/0106091 A1 | 4/2015 | Wetjen et al. | |
| 2015/0281445 A1 | 10/2015 | Kumar et al. | |
| 2015/0281446 A1 | 10/2015 | Milstein et al. | |

OTHER PUBLICATIONS

Office Action Received for U.S. Appl. No. 13/949,467 dated Feb. 6, 2015.
Notice of Allowance Received for U.S. Appl. 14/230,328 dated Feb. 6, 2015.
Notice of Allowance Received for U.S. Appl. No. 14/445,501 dated Feb. 4, 2016.
Office Action Received for U.S. Appl. No. 14/172,993 dated Dec. 18, 2015.
Notice of Allowance Received for U.S. Appl. No. 14/875,130 dated Feb. 24, 2016.
U.S. Appl. No. 61/753,641, filed Jan. 17, 2013.
Office Action Received for U.S. Appl. No. 14/230,463 dated Mar. 30, 2016.
Office Action Receivied for U.S. Appl. No. 14/186,404 dated May 8, 2015.
Office Action Received for U.S. Appl. No. 13/968,692 dated Jun. 11, 2015.
Office Action Received for U.S. Appl. No. 14/230,463 dated Jun. 19, 2015.
Notice of Allowance Received for U.S. Appl. No. 13/949,467 dated Jul. 17, 2015.
Notice of Allowance Received for U.S. Appl. No. 14/186,404 dated Sep. 1, 2015.
Office Action Received for U.S. Appl. No. 14/230,463 dated Oct. 1, 2015.
Office Action Received for U.S. Appl. No. 14/661,676 dated Sep. 21, 2015.
Office Action Received for U.S. Appl. No. 14/445,501 dated Nov. 24, 2015.
Office Action Received for U.S. Appl. No. 13/968,692 dated Nov. 30, 2015.
Office Action Received for U.S. Appl. No. 14/875,130 dated Dec. 1, 2015.
Notice of Allowance Received for U.S. Appl. No. 14/661,676 dated Nov. 20, 2015.
Asterisk DTMF, Voip=Info.o—A Reference Guide to All Things VoIP, four pages, retrieved on Mar. 18, 2013 from www.voip-info.org/wiki/view/Asterosk+DTMF.
Notice of Allowance received for U.S. Appl. No. 13/861,102, mailed May 2, 2014.
Office Action Received for U.S. Appl. No. 14/186,404 dated Dec. 12, 2014.
Office Action Received for U.S. Appl. No. 14/230,328 dated Nov. 28, 2014.
Schulzrinne, H; Petrack, S; Request for Comments 2833 ("RFC 2833"), RTP Payload for DTMF Digits, Telephony Tone, and Telephony Signals May 2000, 29 pages, The Internet Society, U.S.
Donovan, S; Request for Comments 2976 ("RFC 2976"), The SIP INFO Method; The Internet Society, Oct. 2000, 9 pages, U.S.
Burger, E.; Dolly, M; Request for Comments 4730 ("RFC 4730"), A Session Initiation Protocol (SIP) Event Package for Key Press Stimulus (KPML), The Internet Society, Nov. 2006, 56 pages, U.S.

(56) References Cited

OTHER PUBLICATIONS

Schulzerinne, H; Taylor, T; Request for Comments 4733 ("RFC 4733"), RTP Payload for DTMF Digits, Telephony Tones, and Telephony Signals, The IETF Trust, Dec. 2006, 46 pages, U.S.

Homberg, C; Burger, E; Kaplan, H.; Request for Comments 6086 ("RFC 6086"), Session Initiation Protocol (SIP) Info Method and Package Framework, Internet Engineering Task Force, Jan. 2011, 36 pages, U.S.

Kuthan, Jiri; Sisalem, Dorgham; SIP: More Than You Ever Wanted to Know About; Powerpoint Presentation, Mar. 2007, 242 pages, Tekelec, U.S.

Three Steps for Attacking Adherence Problems, Reynolds, Penny, Contact Center Association, Jan. 24, 2012.

Office Action Received for U.S. Appl. No. 14/073,083 dated Feb. 16, 2016.

Notice of Allowance Received for U.S. Appl. No. 14/073,083 dated May 25, 2016.

Office Action Received for U.S. Appl. No. 14/743,200 dated Apr. 7, 2016.

Notice of Allowance Received for U.S. Appl. No. 15/081,358 dated Jul. 27, 2016.

Office Action Received for U.S. Appl. No. 15/239,260 dated Jan. 27, 2017.

Notice of Allowance Received for U.S. Appl. No. 13/968,692 dated Nov. 15, 2016.

Office Action Received for U.S. Appl. No. 14/880,542 dated Jan. 4, 2016.

Notice of Allowance Received for U.S. Appl. No. 14/880,542 dated Jun. 1, 2016.

Notice of Allowance Received for U.S. Appl. No. 14/172,993 dated Feb. 26, 2016.

Office Action Received for U.S. Appl. No. 14/743,200 dated Aug. 10, 2016.

Office Action Received for U.S. Appl. No. 15/051,930 dated Nov. 10, 2016.

Office Action Received for U.S. Appl. No. 14/183,083 dated Oct. 7, 2016.

Notice of Allowance Received for U.S. Appl. No. 14/743,200 dated Nov. 10, 2016.

Office Action Received for U.S. Appl. No. 15/051,930 dated Mar. 3, 2017.

Office Action Received for U.S. Appl. No. 15/231,154 dated Feb. 10, 2017.

\* cited by examiner

| REAL TIME SPEECH ANALYTICS AGENT SCORING REPORT |||||
|---|---|---|---|---|
| Agent | Date/Time | Positivity Score | Compliance Score | No. of Alerts |
| Jane Doe | 7/13/2013 12:22<br>7/13/2013 13:04<br>7/13/2013 14:24 | 7<br>5<br>2 | -1<br>+3<br>-3 | 2<br>2<br>4 |
| Jim Johnson | 7/13/2013 09:28<br>7/13/2013 11:44<br>7/13/2013 12:33 | 5<br>4<br>5 | +2<br>-3<br>0 | 0<br>1<br>0 |
| John Smith | 7/13/2013 13:52<br>7/13/2013 15:31<br>7/13/2013 17:52 | 3<br>4<br>1 | +4<br>+2<br>-6 | 0<br>1<br>6 |

FIG. 12

ARCHITECTURE FOR PROCESSING REAL TIME EVENT NOTIFICATIONS FROM A SPEECH ANALYTICS SYSTEM

BACKGROUND

Speech analytics has matured to the point that the technology can be accurately and reliably used to detect keywords in the speech of a call involving an agent in a contact center and remote party. Receiving a notification from a speech analytics system that certain words or phrases have been recognized allows various capabilities to be defined and introduced into the contact center. For example, an agent can be more effectively monitored to determine if the agent is adhering to contact center policies. However, merely receiving a notification that a particular keyword has been detected may be of marginal value if the context is not known. For example, a speech analytics system merely knowing a keyword was detected during a call may be of limited utility if it is not known which party stated the keyword.

Further, a given call may be monitored for a number of different keywords associated with various distinct contexts for different purposes. Defining an efficient and modular architecture for handling these notifications is necessary to accommodate various current and future capabilities and to realize a manageable and extendable system. For example, speech analytics systems can be configured to operate in various modes on different types of calls, and for different purposes. This in turn, may impact how the speech analytics system and related components are configured. In order to accommodate current applications, as well as future potential applications of speech analytics, systems and methods are required for defining a flexible architecture for effectively handling notifications from the speech analytic system.

SUMMARY

In general, embodiments of the present invention provide computer-program products, methods, systems, apparatus, and computing entities for processing event notifications from a speech analytics system. An application specific processing system receives the event notifications, which may be call event related or speech related. Call event related event notifications inform the application specific processing system of calls which are established or terminated, while speech relate event notifications provide notification of a keyword that is detected during the call. In one embodiment, the call involves an agent in a contact center and a remote party. A call handler in the contact center processes the call, and provides an audio stream of the agent's audio and another audio stream of the remote party's audio to the speech analytics system.

An event handler module in the application specific processing system receives the event notifications and forwards the event notifications as appropriate to application specific modules. The application specific module provides functionality for handling a particular audio context as desired. In one embodiment, each application specific module receives each call related event notification indicating a call has been established between the call handler and the speech analytics system. The application specific module creates a call instance in response. The call instance is terminated when a call related event notification is received indicated that call has ended.

The application specific module may also receive speech related event notifications that inform the application specific module of keywords that were detected in the call. In various embodiments, the application specific module may update information in the call instance, write data to a file, provide visual indications to the agent's computer, send notifications, etc. In this manner, a modular architecture is provided that is extensible and can address various application specific processing in conjunction with various audio contexts of a call.

As is discussed in greater detail below, the subject matter disclosed herein may be implemented as a computer-controlled apparatus, a method, a computing system, or an article of manufacture such as a computer-readable storage medium. These and various other features will be apparent from the following Detailed Description and the associated drawings.

This Summary is provided to exemplify concepts at a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein:

FIG. 12 illustrates one embodiment of an agent speech analytics scoring report.

DETAILED DESCRIPTION

Figure 1:
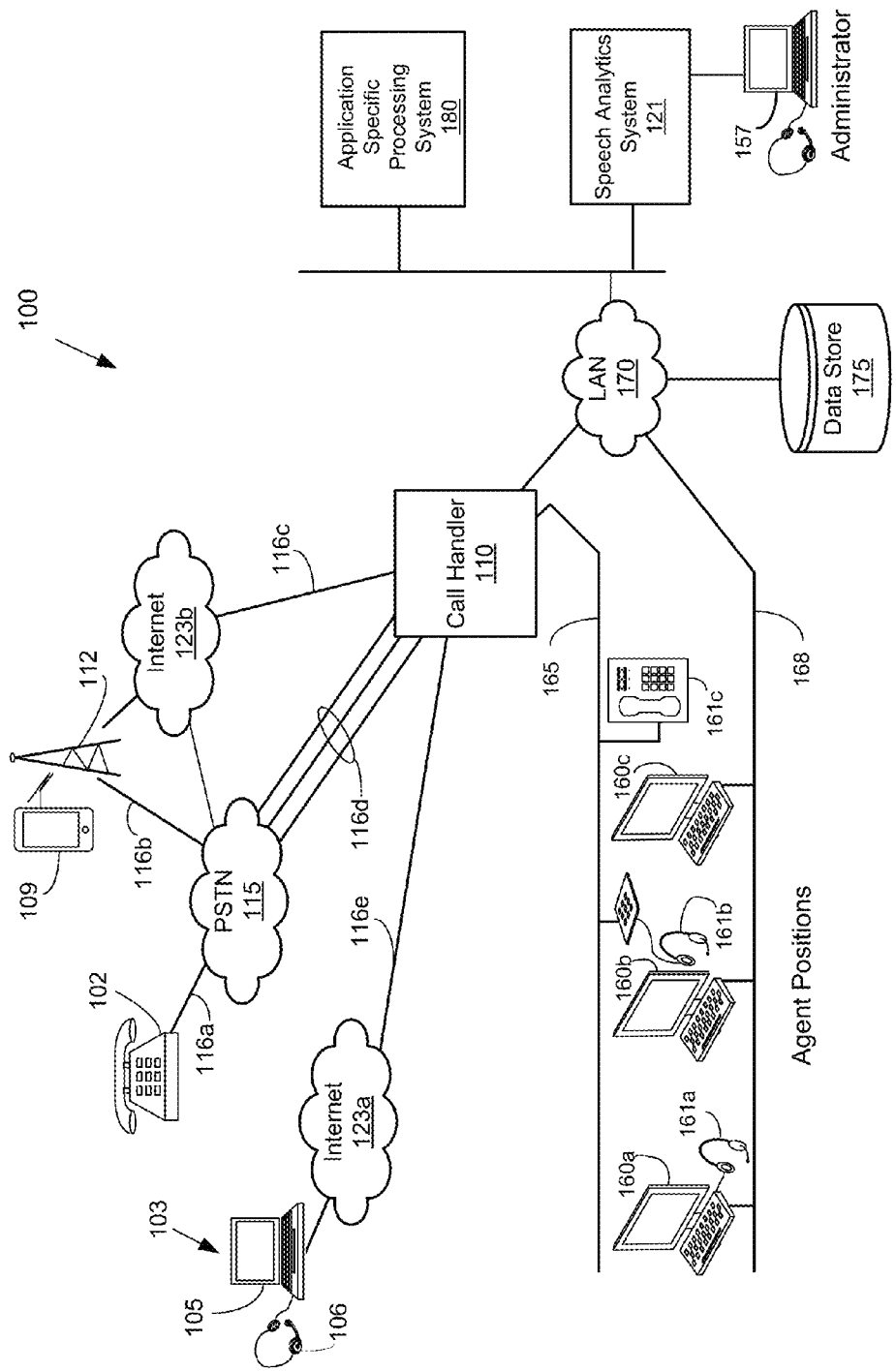
FIG. 1 illustrates one embodiment of a contact center incorporating a speech analytics system according to the concepts and technologies disclosed herein.

A speech analytics system ("SAS") can be deployed in a contact center and function to detect and report the presence of certain words or phrases, referred to herein as "keywords," detected in the audio of a call, such as described in U.S. patent application Ser. No. 13/949,467, now U.S. Pat. No. 9,225,833, filed on Jul. 24, 2013, and entitled Management System for Using Speech Analytics to Enhance Contact Center Agent Conformance and U.S. patent application Ser. No. 13/968,692, now U.S. Pat. No. 9,602,665, filed on Aug. 16, 2013, and entitled Functions and Associated Communication Capabilities for a Speech Analytics Component to Support Agent Compliance in a Call Center, the contents of both of which are incorporated for reference for all that they teach.

In some embodiments, the SAS can detect which individual (e.g., the party or the agent) spoke a keyword. The utility of speech analytics is complicated by the wide variety of calls, purposes, and contexts that may be involved. For example, a SAS can be used to manage agent compliance with various contact center policies and these policies may involve telemarketing sales calls, debt collection calls, or healthcare service related calls, with each application having its own requirements. Thus, to maximize the utility of speech analytics, it is important to know the context in which keywords are detected. The particular circumstance of an audio exchange between an agent and a remote party is referred to herein as an "audio context." Reference to "party" without further limitation may refer to either the agent or the remote party (i.e., calling or called party). In some instances, the audio context may involve only speech from one party. In other instances, the audio context may refer to a particular audio exchange about certain subject matter or purpose between the two parties. In order to automate and manage such audio contexts, the context must be flexibly, but yet clearly, defined. Further, to provide an extensible system, the architecture must be modular and allow the overall system to be adapted to a variety of situations and applications. This includes the flexibility to accommodate applications which are not currently envisioned.

This modular architecture can be realized using three main components. First, a call handler is present for processing calls in the contact center. These calls may be based on various technologies, and may include inbound and/or outbound calls. Second, a SAS analyzes audio in a call and provides notifications when a particular word or phrase is detected in the audio of a call. Third, an application specific processing system ("ASPS") receives the notifications from the SAS and performs the processing defined for that specific application. This may involve further interactions with the call handler and/or agent workstation. This modular architecture is predicated on limiting the functionality of the SAS to performing speech related processing, namely keyword recognition. This allows aspects unique to the contact center, the audio context, and the calling campaign to be isolated, to a degree, from the speech analytics system, so that the SAS is only required to focus on audio processing. Reference to the audio context refers to the current situation relative to the dialogue involving an agent and remote party for a particular call.

This module architecture also allows, to a degree, the SAS to be replaced or upgraded without having it being dependent with the various application specific functions that may be performed. Thus, the speech analytics system is, to a degree, agnostic as to the particular audio context of the call, e.g., whether the call is a debt collection call or healthcare service delivery related call.

Exemplary Contact Center Architecture

The concepts and technologies disclosed herein may be implemented in a contact center environment. FIG. 1 provides one embodiment of a contact center incorporating a SAS. FIG. 1 shows one embodiment of a contact center architecture 100 illustrating the various technologies disclosed herein. The architecture 100 shown in FIG. 1 may process voice calls that are inbound-only, outbound-only, or a combination of both (sometimes referred to as a "blended" contact center) relative to a call handler 110. Although many aspects of contact center operation are disclosed in the context of voice calls, in various embodiments, the contact center may process other forms of communication such as, for example, facsimiles, emails, text messages, video calls, and chat messages.

Since the contact center may handle calls originating from a calling party, or initiated to a called party, the term "party" or "remote party" without any further qualification, refers to a person associated with a call, or other form of communication processed by the contact center, where the call is either received from, or placed to, the party. The term "caller," if used, will also generally refer to a party communicating with the contact center, but in many cases this usage is exemplary and use of the term "caller" is not intended to limit the concepts to only inbound calls or voice calls, unless the context dictates such.

Depending on the embodiment, inbound voice calls may originate from parties using a variety of different communication device types including, smart phone devices 109, conventional telephones 102, or computer-based voice processing devices 103, which may comprise a computer 105 and a headset 106. For instance, a calling party may originate a call from a conventional analog telephone 102 connected to a public switched telephone network ("PSTN") 115 using an analog plain old telephone service ("POTS") line. The call may be routed by the PSTN 115 and may use various types of facilities 116*d*, including, but not limited to: T1 trunks, SONET based fiber optic networks, asynchronous transfer mode networks, etc. Various types of routers, switches, bridges, gateways, and other types of equipment may be involved in the processing of the calls.

In various embodiments, inbound calls from callers to the contact center may be received at a call handler 110, which could be, e.g., an automatic call distributor ("ACD") or an outbound dialer. In particular embodiments, the call handler 110 may be a specialized form of switch for receiving and routing inbound calls under various conditions. The call handler 110 may route an incoming call over contact center facilities 165 to an available agent. The call handler 110 may also incorporate other switching functionality, including the ability of conferencing or bridging another entity to an existing call, such as an interactive voice response unit or a supervisor.

Depending on the embodiment, the facilities 165 may be any suitable technology for conveying the call to an agent, including but not limited to a local area network ("LAN"), wide area network ("WAN"), ISDN, IP, or conventional TDM circuits. In addition, the facilities 165 may be the same, or different from, the facilities used to transport the call to the call handler 110.

In various embodiments, calls may be routed over facilities 165 to an agent for servicing. An agent typically uses a computing device 160a-160c, such as a personal computer, and a voice device 161a-161c. The combination of computing device 160a-160c and voice device 161a-161c may be referred to as a "workstation." In many instances, the computing device handles Voice over Internet Protocol ("VoIP") so that reference to the "computer workstation" or the "agent's computer" refers to the computer processing device aspect of the workstation, but which may be closely integrated with handling voice as well (e.g., via a so-called "soft phone" capability). Thus, for these particular embodiments, the workstation can be assumed to have at least a data capability and may also have a voice capability.

Depending on the embodiment, the interaction between the call handler 110 and agent computers 160a-160c, as well as other components, may involve using a local area network ("LAN") 170. In particular embodiments, when an agent is interacting with a called or calling party, the agent may use his computer 160a-160c to further interact with other enterprise computing systems, such as, an interactive voice response system ("IVR"), a recording system, payment processing system, etc. In some embodiments, the data facility 168 may also carry voice data, so that separate facilities 165 may not be required that are dedicated to voice traffic.

In addition to receiving inbound communications, the contact center may also originate communications to a called party, referred to herein as "outbound" communications. In some embodiments, a call handler 110 may comprise a dialer, such as a predictive dialer, to originate outbound calls at a rate designed to meet various criteria. In various embodiments, the call handler 110 is typically configured to dial a list of telephone numbers to initiate outbound calls. Data for the calls may be stored in a data store 175. After the calls are originated, a transfer operation may connect the call with an agent or a queue.

Attached to the LAN 170 are two other systems. The SAS 121 is the computer processing system executing speech analytics software, which is referred to herein as a speech analytics module ("SAM"). The SAM analyzes audio in a call and provides an indication when a particular word or phrase is detected. This word or phrase is referred to as a "keyword." Use of the term "keyword" should not be construed as limiting recognition to a single word. The SAS 121 interfaces with the LAN 170 to receive streaming audio data. In this embodiment, the streaming audio data conveys voice in packetized form. Typically, this uses any of the various currently available digital voice protocols known to those skilled in the art, including VoIP, RTS, SIP, RTPS, etc. In some embodiments, this may allow the SAS to be isolated as from operational aspects of the contact center. For example, the SAS may not be aware of whether the audio data it is analyzing is for an incoming or outgoing call relative to the remote party. Further, it may be desirable to keep the SAS unaware of the contact center architecture, so that changes to the contact center architecture do not impact the SAS and vice versa.

The other system component shown in FIG. 1 is the ASPS 180. The ASPS serves various functions, including receiving the keyword recognition indications from the SAS and determining what needs to be done in response to the indication. The ASPS performs the specific functions for the specific application for which speech recognition is being used. For example, at a high level, the contact center may utilize speech analytics to monitor whether agents are properly identifying the company's name when greeting a caller.

The SAS 121 may be configured to recognize the agent's greeting and determine whether a particular company name was used. This information is provided to the ASPS which then decide what to do with this information. The particular application may be configured to record each instance when the agent does (or does not) use the proper company name when greeting a caller. The application may be configured to provide a visual reminder to the agent on the agent's computer if the agent fails to do so.

Although a number of the above entities may be referred to as a "system," each may be also referred to in the art as a "computing device," "unit" or "component." Use of the word "server" does not require the component to interact in a client-server arrangement with other components, although that may be the case. A server may incorporate a local data store and/or interface with an external data store. Further, the above systems may be located remotely from (or co-located with) other systems. Furthermore, one or more of the systems may be implemented on a single processing device to perform the functions described herein. In addition, the contact center architecture 100 may be provided as a hosted solution, where the call processing functionality is provided as a communication service (a so-called "communication-as-a-service" or "CaaS") to a contact center operator. Thus, there is no requirement that the components identified above must be actually located in a contact center location or controlled by a contact center operator. In addition, depending on the embodiment, the agent positions may be remotely located from the other components of the contact center, sometimes referred to as a "virtual contact center." Further, the SAS 121 or the ASPS 180 could be accessed as a hosted element, or integrated into a single computing platform. Those skilled in art will recognize FIG. 1 represents one possible configuration of a contact center architecture 100, and variations are possible with respect to the protocols, facilities, components, technologies, and equipment used.

Speech Processing Architecture

FIG. 1 provides a high level overview of the contact center and involved systems, and focuses, to an extent, on physical components. At this point, it is appropriate to focus more on the logical capabilities provided by the components, and this is illustrated in FIG. 2, which simplifies certain aspects of FIG. 1, and expands on other aspects.

Figure 2:
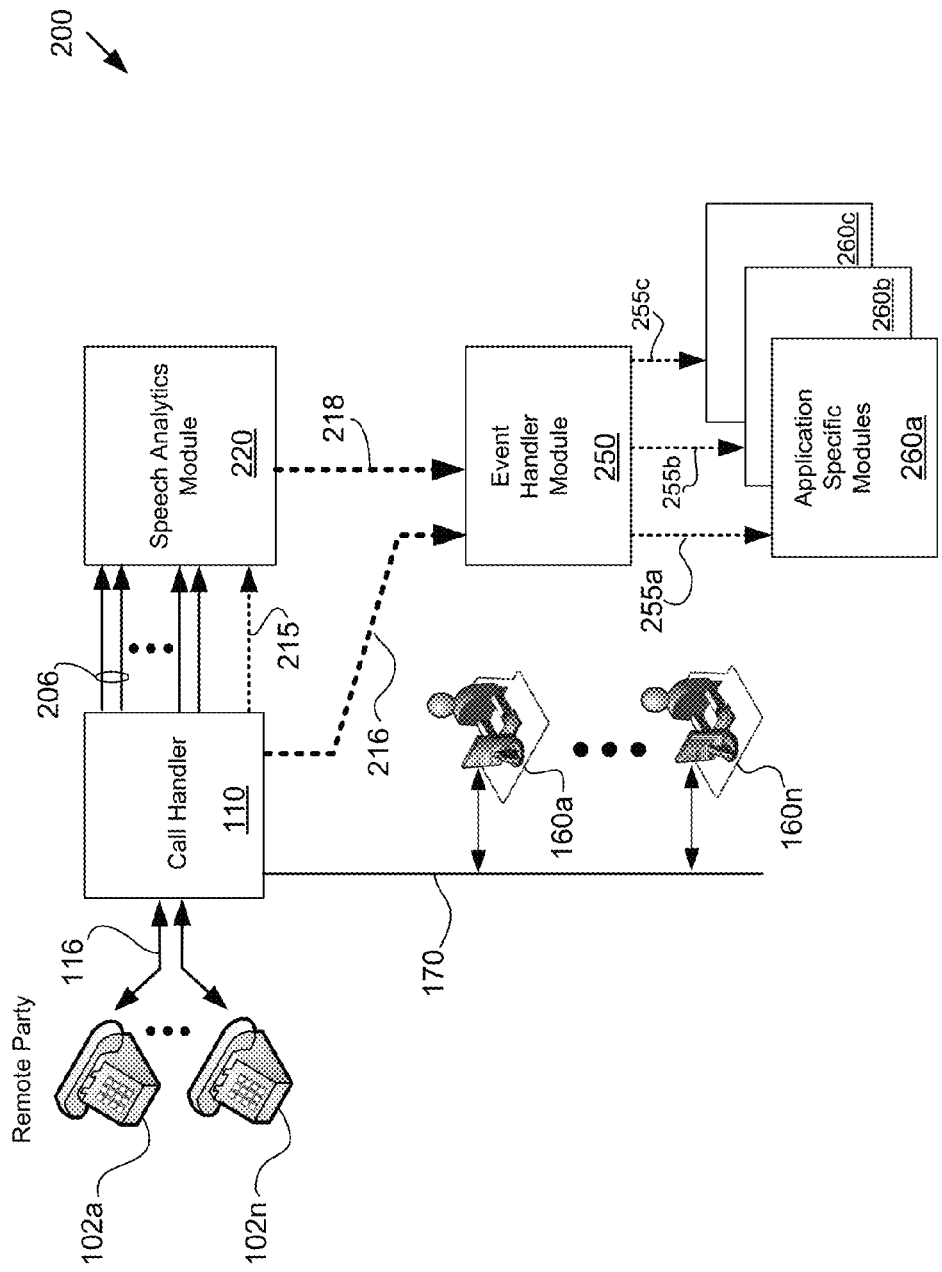
FIG. 2 discloses one embodiment of the architecture for processing event notifications in an application specific processing system according to the concepts and technologies disclosed herein.

Turning to FIG. 2, the users (remote party) are represented for simplicity by the conventional telephones 102a, 102b, which may communicate voice via various forms of facilities 116 to the call handler 110. The voice can be received as inbound or outbound calls relative to the call handler 110. Use of the term "remote party" refers to the party speaking to the agent, whether the party is a called party or a calling party. The voice and may be conveyed via various forms of voice technologies (VoIP, TDM, wireless, etc.). The call handler 110 communicates via the LAN 170, shown in a simplified form, with the agent's computers 160a-160n. In this case, the LAN 170 may also incorporate the functionality of conveying audio (voice) information along with data to the agent workstations so that only a single facility is shown.

The remaining portion of FIG. 2 focuses on the modular aspects of various processing components, as opposed to the physical systems where the components may be found. Specifically, FIG. 2 illustrates a speech analytics module ("SAM") 220. The SAM is the software executing in the speech analytics system 121 of FIG. 1. The SAM performs various speech analytics related to processing audio from a call between the agent and the remote party. In some embodiments, the SAM 220 may be executing in a hosted server in a cloud, on a separate computer system in the contact center, or even in the ASPS 180. In some embodiments, the SAM may comprise licensed software from a third party speech recognition vendor that has developed speech analytics, and which can execute on a variety of hardware platforms.

In some embodiments, the SAM is configured to process audio from the call handler conveyed as VoIP streams, although a variety of protocols and techniques could be used. In various embodiments, the audio from a single call may be conveyed as a single VoIP stream containing audio from both the agent and the remote party. In other embodiments, such as shown in FIG. 2, two audio streams 206 are used per call. One audio stream conveys the agent audio, and another audio stream conveys remote party audio. When these multiple streams per call are established, the SAM 220 knows which audio stream is associated with the agent and which audio stream is associated with the remote party. Thus, it becomes straightforward for the SAM 220 to know which party spoke a particular keyword by knowing which channel the audio was conveyed on. Further information for how the interface may be configured is found in U.S. Pat. No. 9,456,083, entitled "Configuring Contact Center Components for Real Time Speech Analysis," the contents of which are incorporated by reference for all that it teaches. Since there may be a number of simultaneous calls being handled by the call handler 110, there may be a corresponding number of pairs of streams established to the SAM 220. The establishment of the streams 206 may occur in various ways, including techniques similar to bridging on another party using various conference bridging techniques. Although the SAM is only monitoring the audio, it is part of the call from the perspective of the call handler 110.

The call handler 110 may also convey signaling information 215 for controlling the streams 206 to the SAM 220. This signaling information 215 may be of various forms, and may be channel-associated or non-channel-associated. This may be different from the signaling used in conjunction with the agent and the remote party. The signaling information 215 is shown in FIG. 2 as a dotted line to readily distinguish it from a channel(s) conveying the audio streams 206 (even though it is recognized that audio information may be conveyed as data and using similar protocols for conveying signaling information). In summary, the call handler 110 may establish a pair of streaming audio channels 206 for each call between the remote party and the agent so that the SAM can monitor the audio of the call. After the call is completed, the streaming channels between the call handler and the SAM may be terminated or ended. The signaling information 215 allows the call handler 110 to inform the SAM 220 appropriately as to the call related event occurring.

As the SAM 220 detects keywords in the audio stream, it will report detection of a keyword. These reports are variously referred to herein as "events," "event notifications," "event notification messages" or "notification messages" in various contexts. The event notifications 218 are conveyed via a signaling channel to an event handler module 250. The event handler module is one of the modules that may be located in the ASPS 180. In one embodiment, there are two categories of event notifications—call related and speech related. As described above, the information regarding establishment or termination of a call is classified as call related event notifications, whereas the information regarding recognition of keywords is classified as speech related event notifications.

The keywords recognized can be a single word, a phrase, sentence, or a set of words defined as meeting a certain criteria. The keyword set may include multiple words and be named. For example, to detect a user answering a question in the affirmative, the keyword set may include words such as "yes," "yeah," "okay," "please do," "all right," etc. This keyword set could be named the "Positive Response" keyword set and the contents may be all construed as variations of different forms of "yes." The process of grouping or recognizing different words as part of a logical set is referred to herein as lemmatization. As expected, the contents of a keyword set can vary widely in various embodiments and for the particular audio context involved.

In some embodiments the keyword being reported by the SAM may be reported as the keyword itself and/or an indication of the keyword set. For example, the SAM may report the event as recognizing a word from the "Positive Response" keyword set and/or the particular word recognized is "okay." In some embodiments, the SAM may merely report each word. In other embodiments, there may be a single keyword set that is reported. In other embodiments, different keyword sets may be implemented, such as one for "positive response" and another for "negative response." If so, then the event handler module or ASM may be required to perform lemmatization. In other embodiments, the SAM may report the keyword set name and thus avoid the need for other modules to perform the lemmatization.

The event handler module 250 receives the event notifications 218 and processes the event notifications 218 from the SAM 220 by routing the event notifications to one or more application specific modules 260*a*-260*c*. Because the SAM is typically analyzing speech from the audio streams of a number of simultaneous calls, the event notifications 218 include information about which call was involved, whether multiple streams per call are involved, and which party spoke the reported word. Other information may include, as indicated above, the word and/or keyword set involved. Thus, an event notification may identify the call, the party speaking the word, the keyword set involved, the keyword or phrase itself, and any other information known by the SAM defining. These are indicated by appropriate identifiers, e.g., "keyword identifier" or "party identifier." Other information may be included in the event notification.

The event handler module 250 may also receive call related event information 216 from the call handler. This can be considered as a special form event notification messages. This event notification message may include call related information about calls which are established from the call handler 110 to the SAM 220, as well as which calls are terminated. This may include information pertaining to a call identifier (for reference purposes), an indication of whether the call is being established or terminated, an agent identifier (via an agent number and/or agent extension number), an address of the stream(s) (via one or more URLs or other identifier(s)), campaign identifier, and the type of codec used in the streams. Other embodiments may have additional or fewer parameters describing the call.

Thus, the event handler module 250 knows which calls are active between the call handler and the SAM 220, and information regarding the call, including the agent involved. Other variations on the signaling protocol are possible. In other embodiments this call related event information 216 is not provided by the call handler to the event handler module, but by the SAM 220 (which receives the information from the call handler). This embodiment would avoid the interface 216 between the call handler 110 and the event handler module 250 shown in FIG. 2, and utilize interface 218.

Consequently, when the SAM reports a keyword detected in an event notification for a call, the event handler module 250 normally has information about the existence of that call. If not, then the event handler module may be out of synchronization with respect to calls that exist between the call handler and the SAM, or some other error condition exists. In some embodiments, the call related event notifications may not be provided to the event handler module, as some applications can operate without knowing that a call has been established. However, additional capabilities are possible when call related event notifications are received. For example, At a high level, the event handler module 250 functions to route the event notification it receives (whether from the call handler or the SAM) to the appropriate application specific modules ("ASM") 260a-260c. In various embodiments, there may be a number of ASMs. Typically, the ASM performs processing associated with a single application, such as the aforementioned agent greeting verification application. Using separate modules limits the functionality of each module to a particular purpose, but makes the system easier to expand. It is possible that all the applications could be implemented in just one, large module, but doing so increases the module's complexity as additional applications are incorporated. In the remainder of this discussion, it is presumed that each ASM handles only one application.

An application in this context means the processing for a particular purpose that is associated with an event notification for specific speech of a call. An example may illustrate the scope. A contact center may monitor agents to ensure that they provide an appropriate greeting to each caller by specifically mentioning the company's corporate brand name. Another application may monitor agents to ensure that they provide certain information regarding the purpose of the call at the beginning of the call. For example, it may be vital that the agent convey accurate information related to legal rights accorded to the individual. More specifically, in debt collection contexts, the agent may be required to indicate the purpose of the call and provide a so-call "mini-Miranda" informational statement to the called party regarding debt collection procedures. Monitoring the agent's initial greeting may be one application that an ASM may handle. The above examples may be considered as two distinct examples of applications that monitor agent greetings.

In another example of an application, the agent may be expected to confirm the telephone number when a party indicates that they would like their number to be added to a do-not-call ("DNC") list. This may be handled by another ASM. In another example, the agent's speech may be monitored to ensure that they are not uttering profanities. Or, in another example of a distinct process handled by an ASM, consent from a caller with respecting to recording a call may be monitored and used to determine whether and how to control call recording. The exact scope of what is a different application will vary from embodiment to embodiment, and conventional software design principles may be applied to determine when a distinct ASM should be developed as opposed to extending an existing ASM.

Returning to FIG. 2, the event handler module 250 routes or forwards event notifications 255a-255c to the appropriate ASM 260a-260c. In some embodiments there may be only one ASM, whereas other embodiments will have numerous ASMs. As will be discussed further, each event notification 216, 218 received by the event handler module 250 may be copied and forwarded to each ASM 260a-260c in some embodiments. In other embodiments, each event notification 218 received by the event handler module 250 from the SAM 220 may be analyzed and forwarded to a specific ASM. The basis and reasons for doing this may vary as will be seen. The process performed in the event handler module 250 for determining how to forward an event notification is referred to herein as the "event handler routing process" or "routing process." When an event notification is forwarded to each and all of the ASMs, this is referred to as a "copy-all" approach for routing event notifications. When an event notification is forwarded to a specific ASM based on its contents, this is referred to as an "analyze and forward" approach.

Once the ASM receives the event notification 255 from the event handler module, the ASM will process the event notification according to the procedures defined for that specific ASM. As it will be seen, the process in the ASM upon receiving the event notification may depend, in part, on whether the ASM uses a "copy-all" or "analyze and forward" routing approach.

Figure 3:
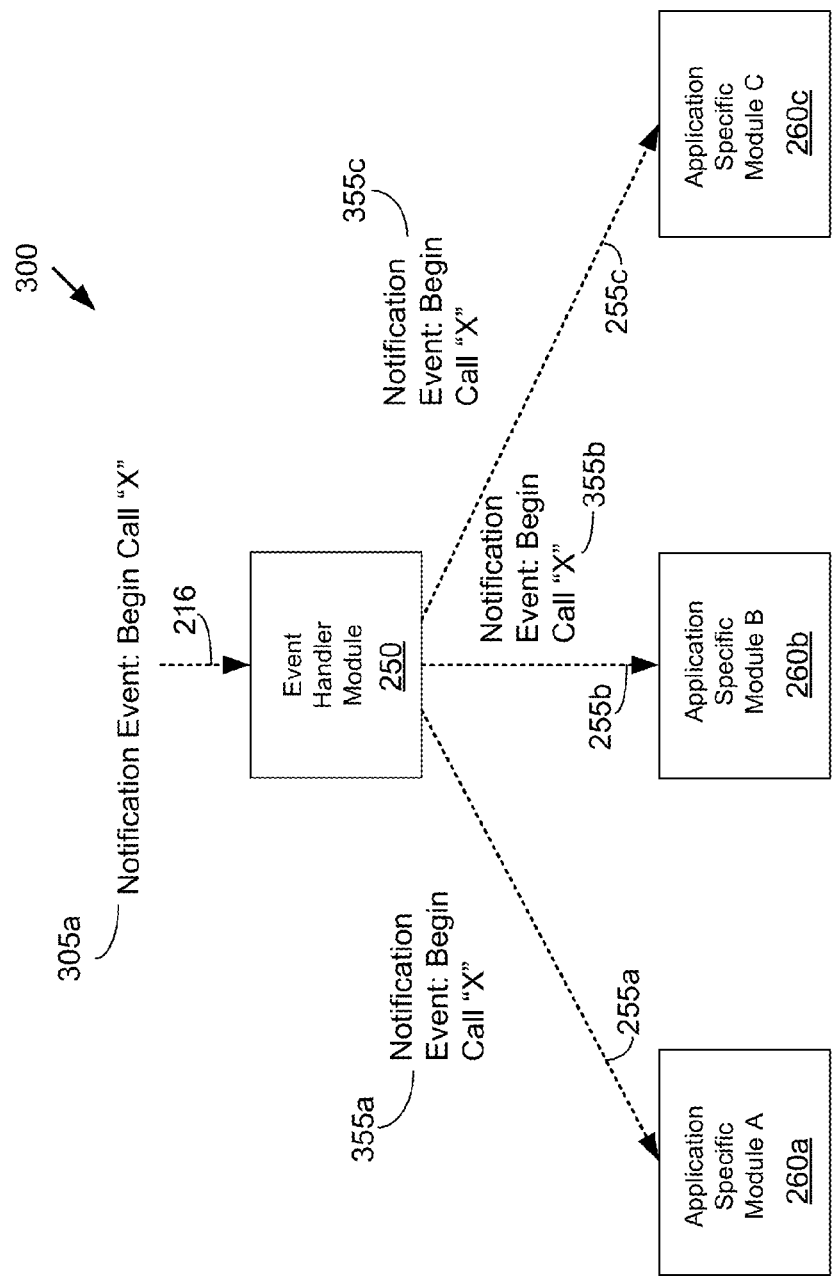
FIGS. 3 and 4 illustrate embodiments of the event handler module providing event notifications to various application specific modules.

An illustration for one use for the copy-all routing process approach is shown in FIG. 3. The architecture diagram 300 of FIG. 3 illustrates an event handler 250 receiving a notification event 305a, "Notification Event: Begin Call "X"". The message name used is for illustrative purposes only, as in actual practice a different name and/or additional parameters may be included.

In this example, the event notification is a call related event notification 216 received from the call handler (not shown in FIG. 3) indicating that a new call (e.g., the two audio streams) has been established to the SAM (also not shown in FIG. 3). The event handler module 250 copies and forwards the received event notification comprising the call related event notification to each of the ASMs 260a-260c. Specifically, the same event notification message 355a is forwarded to ASM A 260a over signaling link 255a, the same event notification message 355b is forwarded to ASM B 260b over signaling link 255b, and the same event notification message 355c is forwarded to ASM C 260c over signaling link 255c.

In this embodiment, each ASM is made aware of each new call established by the call handler to the SAM. In turn, each ASM may create a call instance reflecting the call. The call instance is a data structure generated, modified, and managed by the ASM for the call. As noted before, it is possible that the call related event notification may come from the SAM, as opposed to the call handler. The ASM, in response, then generates a call instance which is data about the call and structured to potentially store data about the call that may be generated during the call. This call instance data may be used by the ASM in handling conditions and events associated with the call. A similar architecture may be used to inform each of the ASMs when the call is ended, and the ASM may then terminate the corresponding call instance. Prior to terminating the call instance, the ASM may record some of the data developed for that call instance in a file or database.

These call related event notifications reflect the establishment of a call. At this point during the call, there may not yet have been any verbal exchange between the agent and the remote party. Thus, it is uncertain at this point what, if any, particular application specific processing will be required. In other words, since there has not been any audio exchanged, the audio context monitored by the ASM likely has not yet occurred, but very well may occur in the immediate future for that call.

Figure 4:
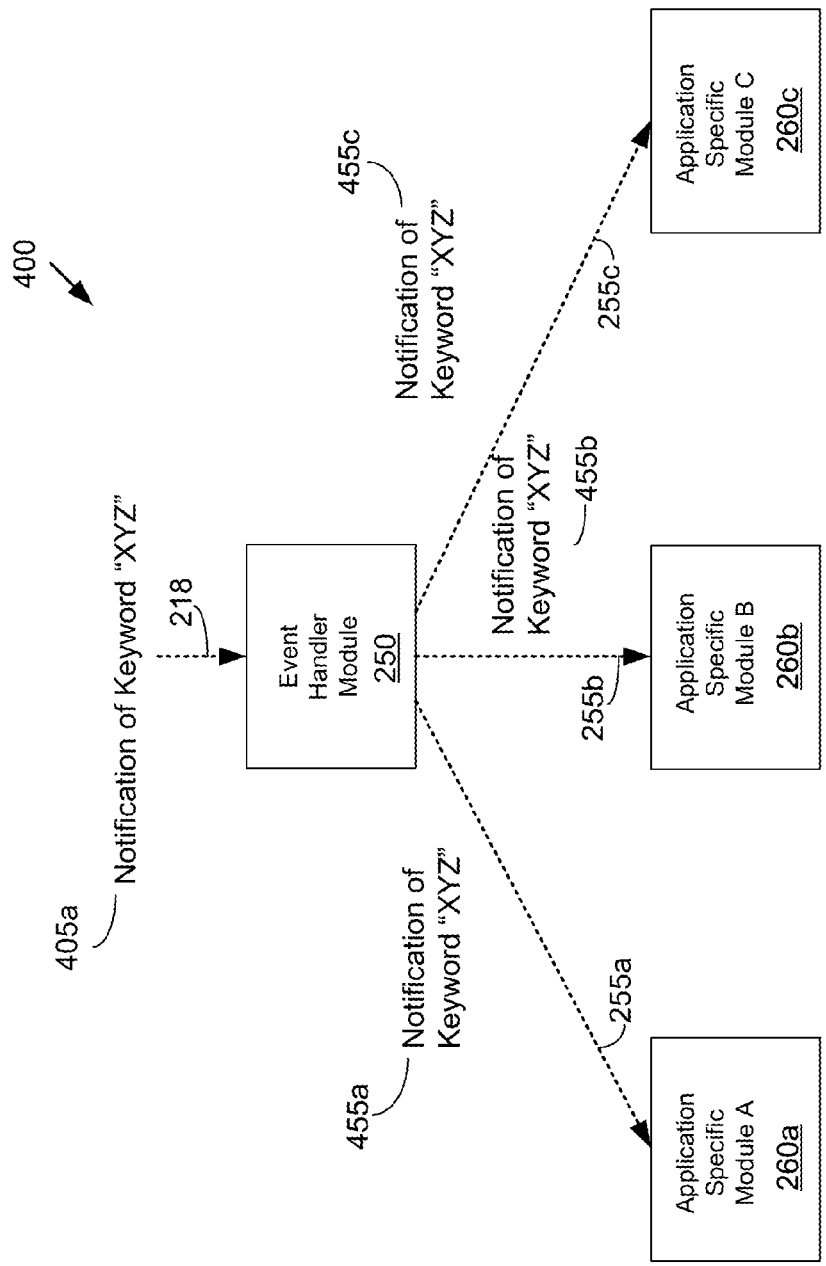

For example, shortly after the call is established and each ASM is made aware of the call, the SAM may detect utterance of a keyword in the audio exchange by one of the parties. For sake of illustration, assume that the SAM is configured with a keyword set to detect phrases and words related to the agent's initial greeting, and more specifically for detecting the presence of the company's name by the agent. Upon detecting the company name, the SAM provides an event notification 405*a* to the event handler as shown in FIG. 4. If we assume the copy-all routing process is used, then the event handler module 250, in turn, routes a copy of the event notification to ASM 260*a*, 260*b*, and 260*c* respectively. Each ASM is now informed that the keyword "XYZ" has been detected.

Assuming that ASM 260*a* is a greeting detection module, this event notification is relevant information to the ASM. This ASM 260*a* can process the event notification message according to the rules defined in therein. However, the same event notification was sent to the other ASMs 260*b*, 260*c* that are directed to other applications (e.g., call escalation control or call recording control). For these ASMs, the event notification is essentially irrelevant information, since these ASM do not deal with analyzing the greeting. These ASMs 260*b*, 260*c* must be configured to ignore such irrelevant event notifications. This is a result of the event handler module using a copy-all process for forwarding event notifications to all ASMs.

Figure 5:
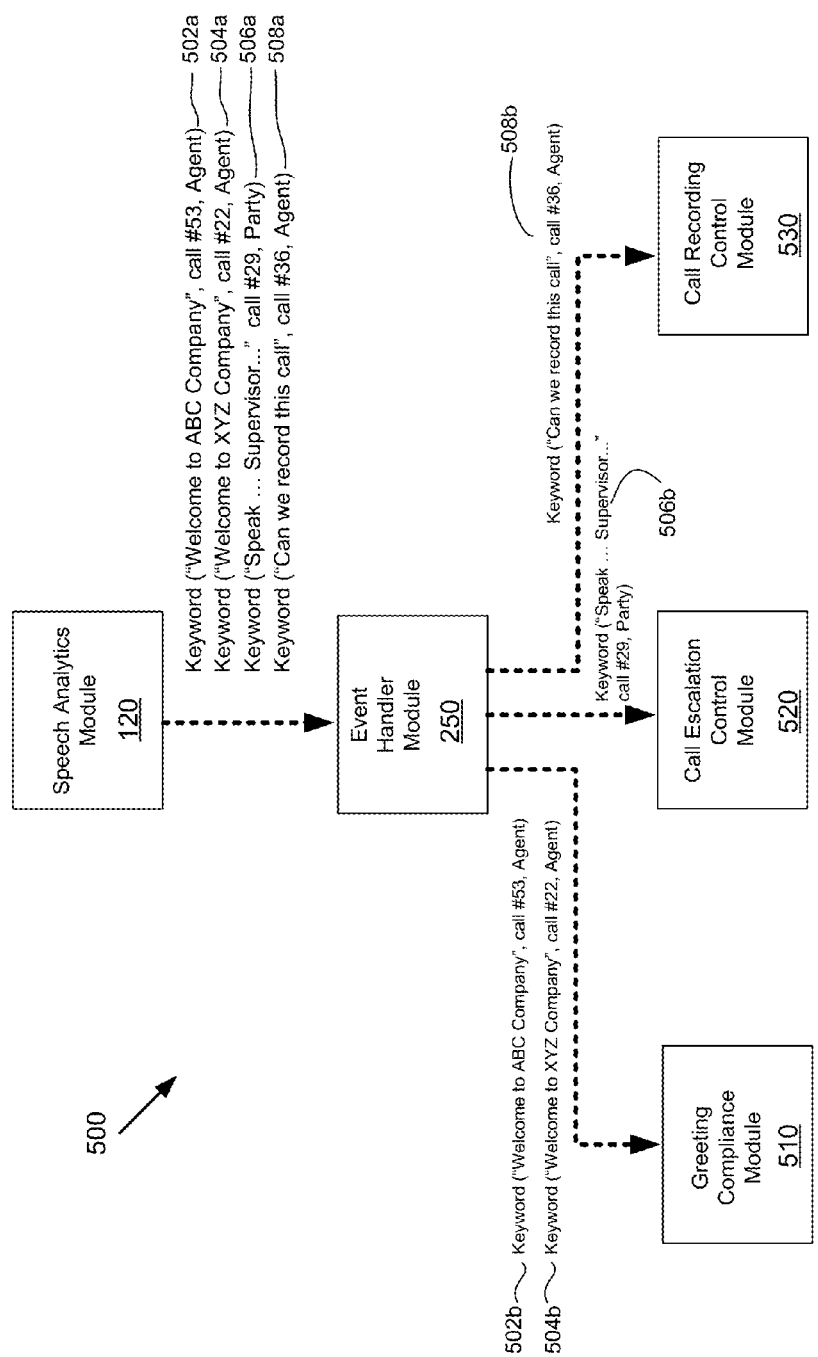
FIG. 5 illustrates one embodiment of the event handler module different event notifications to various application specific modules.

One way to avoid this situation is to have the event handler module use a "analyze and forward" routing process. FIG. 5 shows a more detailed example of the event handler module forwarding event notifications using the "analyze and forward" routing approach. As it will be seen, the "analyze and forward" routing approach for event notifications may be advantageous over the "copy-all" routing approach in some situations. Turning to FIG. 5, three ASM modules 510, 520, and 530 are shown. The greeting compliance module 510 may be configured to monitor the agent's audio to determine is a proper greeting is being used. Another ASM is the call escalation control module 520 that monitors the audio to determine if it is appropriate to conference in a supervisor to the call. A third ASM may be a call recording control module 530 that monitors whether consent is provided by the remote party to record the audio of the call and control audio recording in an appropriate manner.

Assuming there are a number of simultaneous calls being processed by the SAM 120, and a number of event notifications 502*a*, 504*a*, 506*a*, 508*a* may be received by the event handler module 250. The event handler module may analyze each event notification and route the messages 502*b*, 504*b*, 506*b*, and 508*b* as shown in FIG. 5. Specifically, the two event notifications 502*b*, 504*b* pertaining to greetings are routed to the greeting compliance module 510. The event notification 506*b* pertaining to a caller requesting to speak to the agent's supervisor is routed to the call escalation control module 520, and the event notification pertaining to call recording 508*b* is provided to the call recording control module 530.

The "analyze and forward" approach may avoid providing irrelevant information to certain ASMs. In some cases, each ASM is configured to only address information related to a specific keyword set. It is less likely that each ASM will be receiving irrelevant information. For example, keywords pertaining to call recording are likely not relevant to greeting compliance, and hence there is no need to forward such event notifications to the greeting compliance module. This approach for routing event notifications saves processing resources associated with each compliance module.

However, in some situations this may be unavoidable, and the ASM may be nevertheless configured to address irrelevant event notification messages. For example, some applications may share common keywords, and an event notification reporting that keyword may have to be routed to multiple ASMs.

Figure 6:
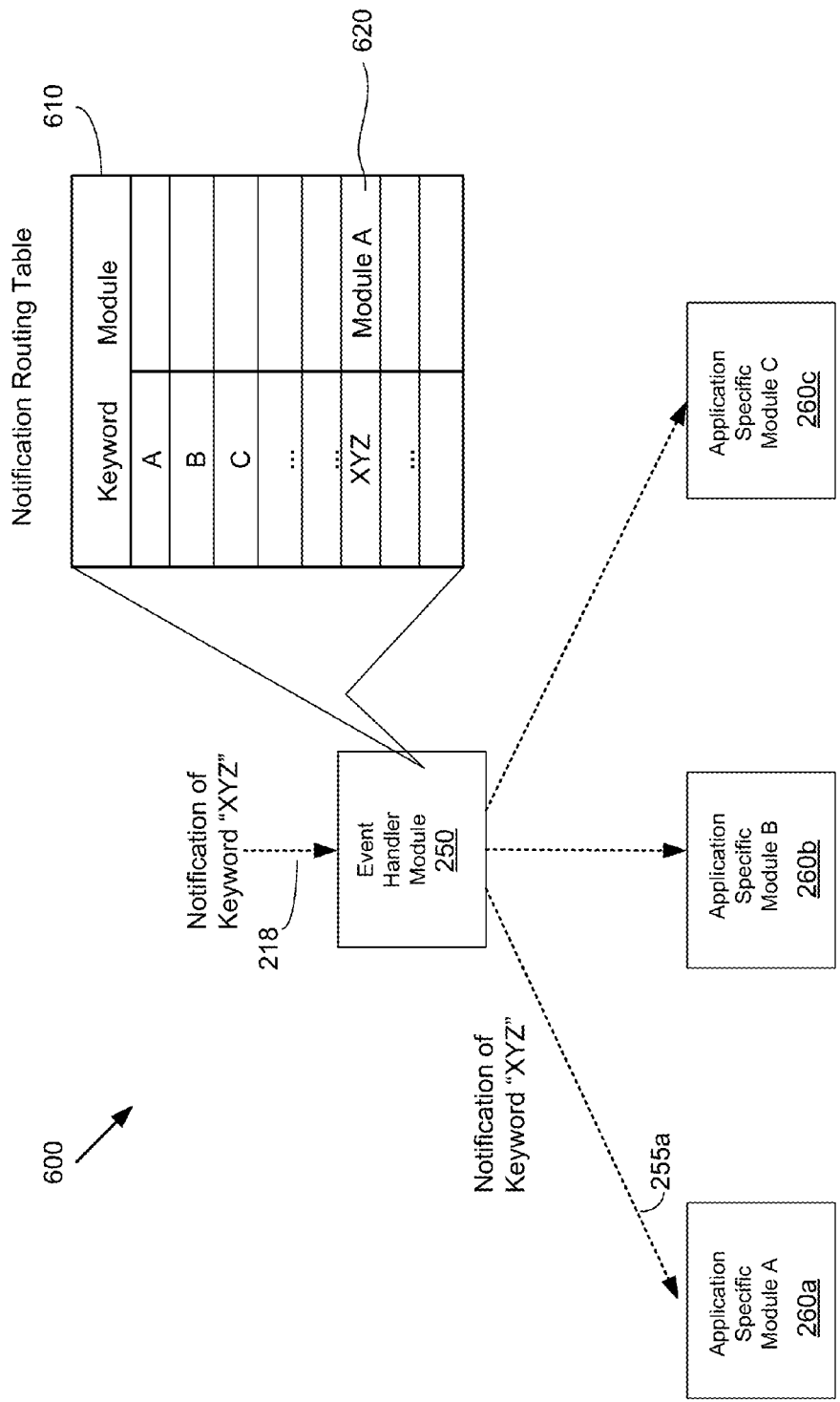
FIG. 6 illustrates one embodiment of a routing table used in the event handler module to provide different event notification to different application specific modules.

The "analyze and forward" routing of event notifications messages can be accomplished using a routing table, such as the one shown in the architecture 600 of FIG. 6. In this figure, a notification routing table 610 is stored in memory as part of the event handler module. The table maps keywords to an ASM. For example, one row 620 indicates that the keyword "XYZ" is routed to module A. Using this approach requires the SAM to provide in the event notification message an indication of the particular keyword detected or the keyword set in which a word was detected.

At this point, it should become clear that the routing table contents are impacted by whether the SAM performs lemmatization or not. Different keywords may be grouped into one keyword set, and the name of the keyword set is included in the event notification. In this case, the keyword set name may be used in the notification routing table. Alternatively, each and every word in the keyword set may be included in the routing table. Somewhere, different words (such as "yes" and "yeah", and "okay" etc.) have to be normalized to the same affirmative indication. This can be done in the SAM or on the ASM, and must be coordinated with the routing table.

Even using the "analyze and forward" routing process, it is possible that in some instances, speech detected in a keyword set may result in event notifications sent to two or more ASMs by the event handler module. For example, in some embodiments there may be two or more ASMs that require detecting a caller providing a telephone number. One application may involve detecting the caller's providing a telephone number for requesting inclusion in a do-not-call ("DNC") list, whereas another application may involve the detecting the caller providing an updated telephone number for future contact. This may be architected as using two distinct ASMs. In both applications, the agent's speech is monitored to ensure that the agent confirms the telephone number. Depending on how the system is architected overall, the event handler may receive an event notification indicating a telephone number, and the routing table is configured to provide that information to two ASMs—one for DNC processing and the other for telephone number updating because both ASMs may involve processing telephone numbers.

In such cases, each of these two ASMs may receive an event notification of the telephone number provided by the caller. Assuming that a prior event notification detected either a DNC request or telephone number update request, then one of the ASMs will have been informed of such and that ASM will be expecting a telephone number indication. Specifically, if the caller has requested their number be on the DNC list, then an event notification will have been generated and sent to the DNC ASM. The DNC ASM will be expecting to receive the telephone number to be included in the DNC list. The other ASM, dealing with updating a telephone number, however, will not have been informed that a telephone update was requested. However, both ASMs may receive the event notification of a telephone number. The telephone number ASM is simply configured to ignore this event notification if it is not expecting the event notification.

Alternatively, the event handler module may track state information, and know that since an event notification was sent to the DNC ASM, that a telephone number subsequently received should be forwarded only to the DNC ASM as well. However, this requires putting application specific knowledge and state information into the event handler, and significantly impacts extending the system to handle new applications. For this reason, this approach is not a preferred embodiment.

Figure 7:
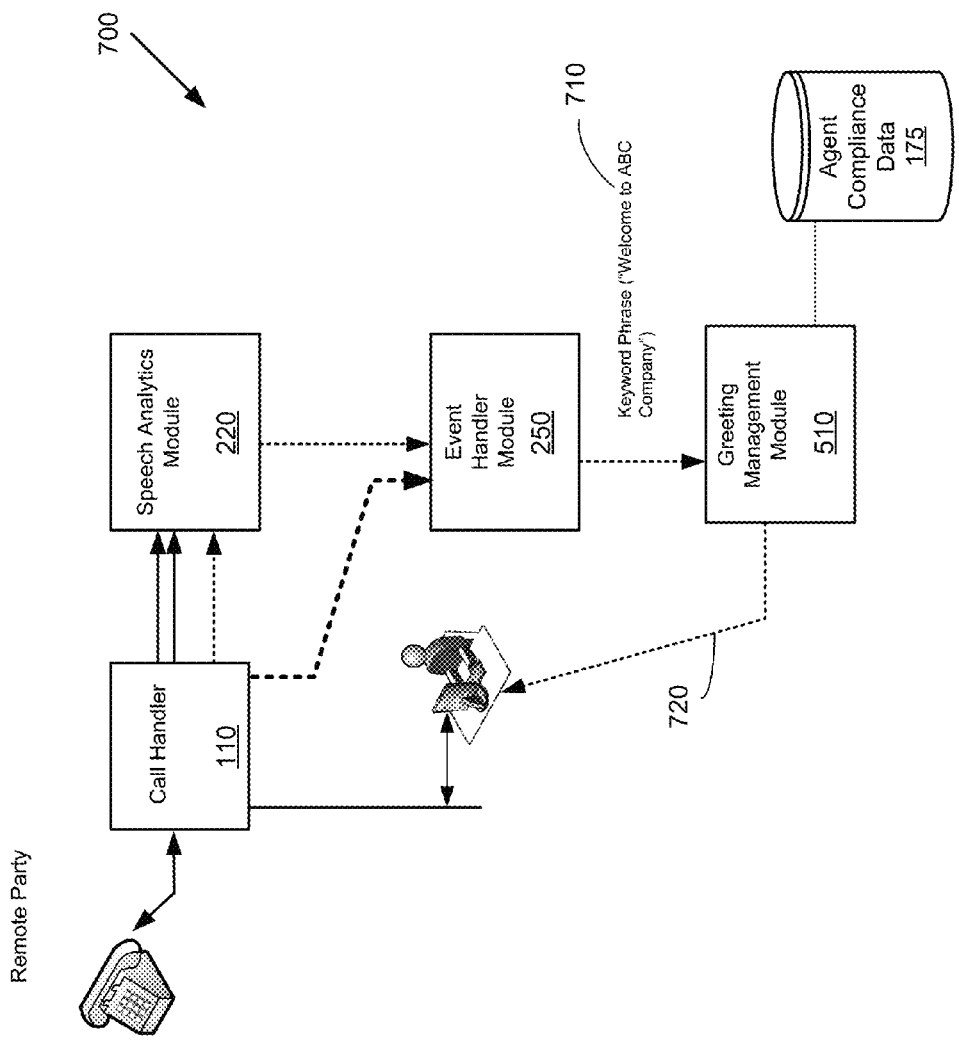
FIG. 7 illustrates one embodiment of an architecture for monitoring the greeting provided by an agent to a caller.

Each ASM may perform various operations in conjunction with processing an event notification. Turning to FIG. 7, a relatively simple example is provided to illustrate some of the operations that are possible. In FIG. 7, the architecture 700 involves the call handler 110 processing a call between a remote party and an agent. The call handler 110 informs the event handler module 250 of the existence of the call, and the event handler module 250 may then inform the greeting management module 510. The greeting management module 510 knows that a call has been established between the agent and the remote party, and is configured to start a timer that reflects the expectation of receiving a subsequent event notification that the agent has provided the mandatory greeting. For example, returning to the prior example, the agent may be required to say the name of the company in their initial greeting.

The SAM 220 receives the audio streams of the call, and provides any event notifications to the event handler module involving define keyword sets. Presumably, there are keywords defined in a keyword set that includes the name of the company. The keyword set may include phrases such as, for example, "Hello, my name is . . . ," "welcome to ABC Company," and "how may I help you." In one embodiment, the SAM provides the event notification to the event handler module 250 upon detecting the company name. The event handler module, in turn, may route the event notification comprising greeting information to the greeting management module 510, which cancels the timer, and then writes agent compliance data 175 in the agent compliance database reflecting the agent performed properly.

If, however, no such greeting is uttered by the agent, then no such corresponding event notification will be generated by the SAM 220 to the event handler 250, and no such event notification message is sent to the greeting management module 510. The timer in the greeting management module 510 that was started at the beginning of the call will presumably expire. This may be set for 10 seconds or so, on the presumption that if the agent does not provide such a greeting in the first 10 seconds of the call, then the greeting will likely not have been provided. Thus, the greeting management module only monitors the beginning of the call for the presence of the greeting and if no such greeting is provided, a warning message may be communicated over a signaling link 720 for display on the agent's workstation. If the agent does not comply within a time period, then non-compliance data may be written to the agent compliance data store.

In other embodiments, the ASM may provide icons or other information for display on the agent's computer desktop, control other systems or contact center elements, write data in various agent files, provide notifications to supervisors, etc. The list of actions that may be taken are detailed in the aforementioned application.

Process Flows

Further details with respect to the processing performed by the event handler and an exemplary ASM are now considered. The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. Greater or fewer operations may be performed than shown in the figures and described herein. These operations may also be performed in a different order than those described herein.

As stated, the event handler routes event notifications to the appropriate ASMs. For purposes herein, messages received from the call handler indicating a call related event is considered an event notification as are messages received from the SAM. The messages from the call handler could be defined in a distinct category, but in either case the event handler module may distinguish call related events from speech recognition related events.

Figure 8:
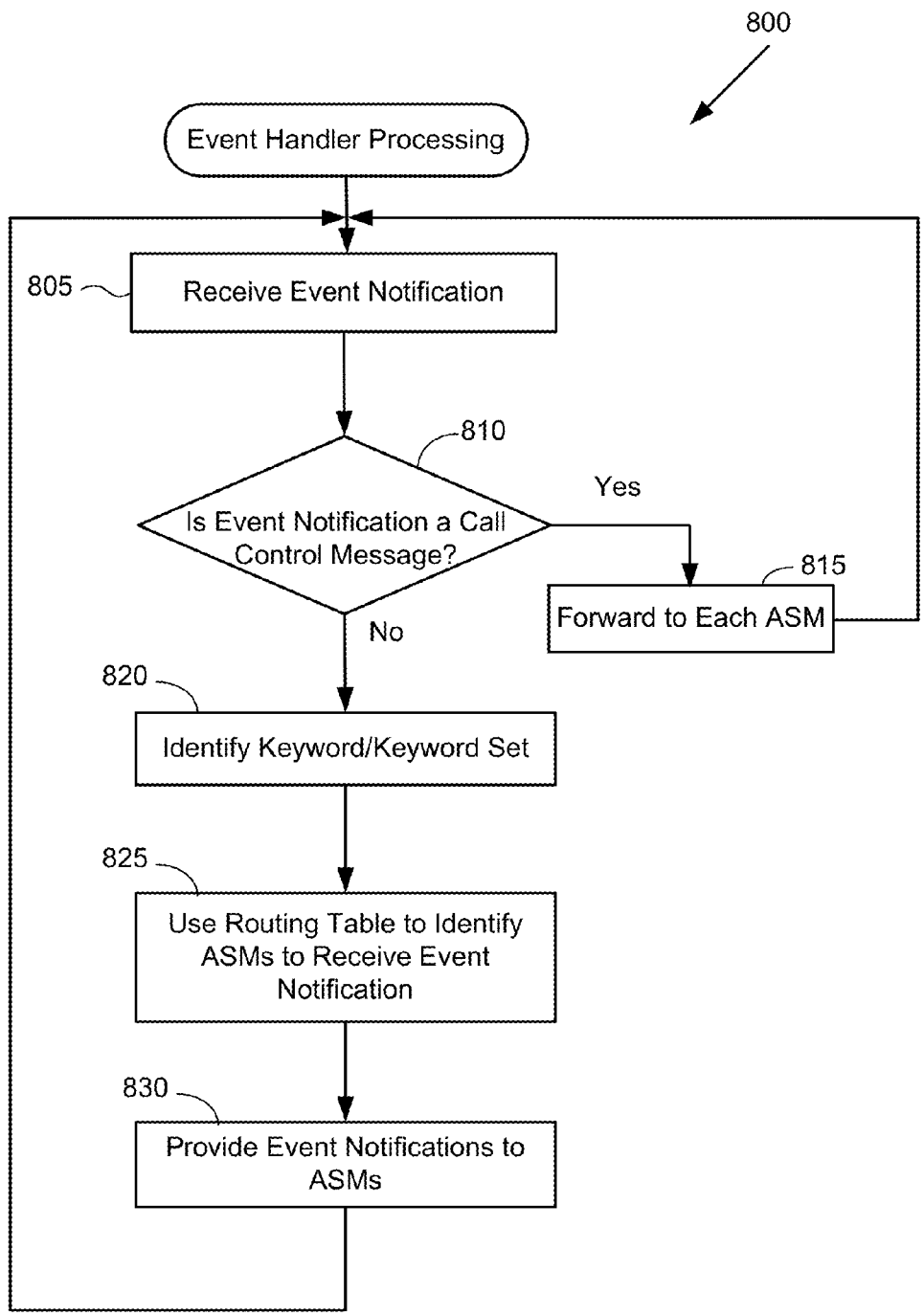
FIG. 8 illustrates one embodiment of a process flow for managing event notification messages in the event handler module.

Turning to FIG. 8, a process performed by the event handler module is presented. The process 800 begins with receiving an event notification in operation 805. This could be from either the call handler or the SAM. Next, a determination is made whether the event notification message is a call control message in operation 810. In some embodiments, the SAM may provide call control event notification messages to the event handler in lieu of the call handler providing such messages. If the event notification is a call control message, which may indicate either a call establishment or a call termination indication, then the event notification message is provided to each of the ASMs in operation 815 using a "copy-all" routing process. In summary, each ASM is informed when a call is created or terminated.

If the event notification is not a call control message, e.g., it is a speech recognition related message, then the next operation involves determining the identified keyword or keyword set (as appropriate) in operation 820. In various embodiments, the event notification provided by the SAM may indicate the detected keyword, the keyword set, or both. This information is then used with the routing table in operation 825 to determine which ASM(s) should receive the event notification message using the "analyze and forward" routing process. Once the ASM(s) have been identified, then the event notifications can be sent to each corresponding ASM in operation 830. In many embodiments, the event notification will be sent to only one ASM. For example, the keyword may be unique for a specific application, and would be associated with only one ASM. However, it is possible in certain instances that the recognized keyword may be found in multiple keyword sets.

The process then loops back to operation 805 to process the next event notification message. In this embodiment, the handling of event notifications in the event handler module may be a stateless operation. That is, the event handler does not retain any state information about calls which were established or whether a prior event notification was sent to a particular ASM. Thus, the event handler module may not know when receiving a call termination event notification whether a call was previously established. As it will be seen, such state information is usually maintained by the ASM.

The state information maintained by the ASM includes, as mentioned above, call state information that allows creating and terminating call instances. Maintaining state information is necessary for the ASM, in part, to know whether certain information was, or was not, provided during a call. For example, only if an ASM knows that a call has started can the ASM know to expect a subsequent event notification message. Specifically, using the greeting application again, how can it be determined the agent did not provide a greeting for a call if there is no knowledge that the call has even occurred? The process flow for managing call instances is shown in FIG. 9.

Figure 9:
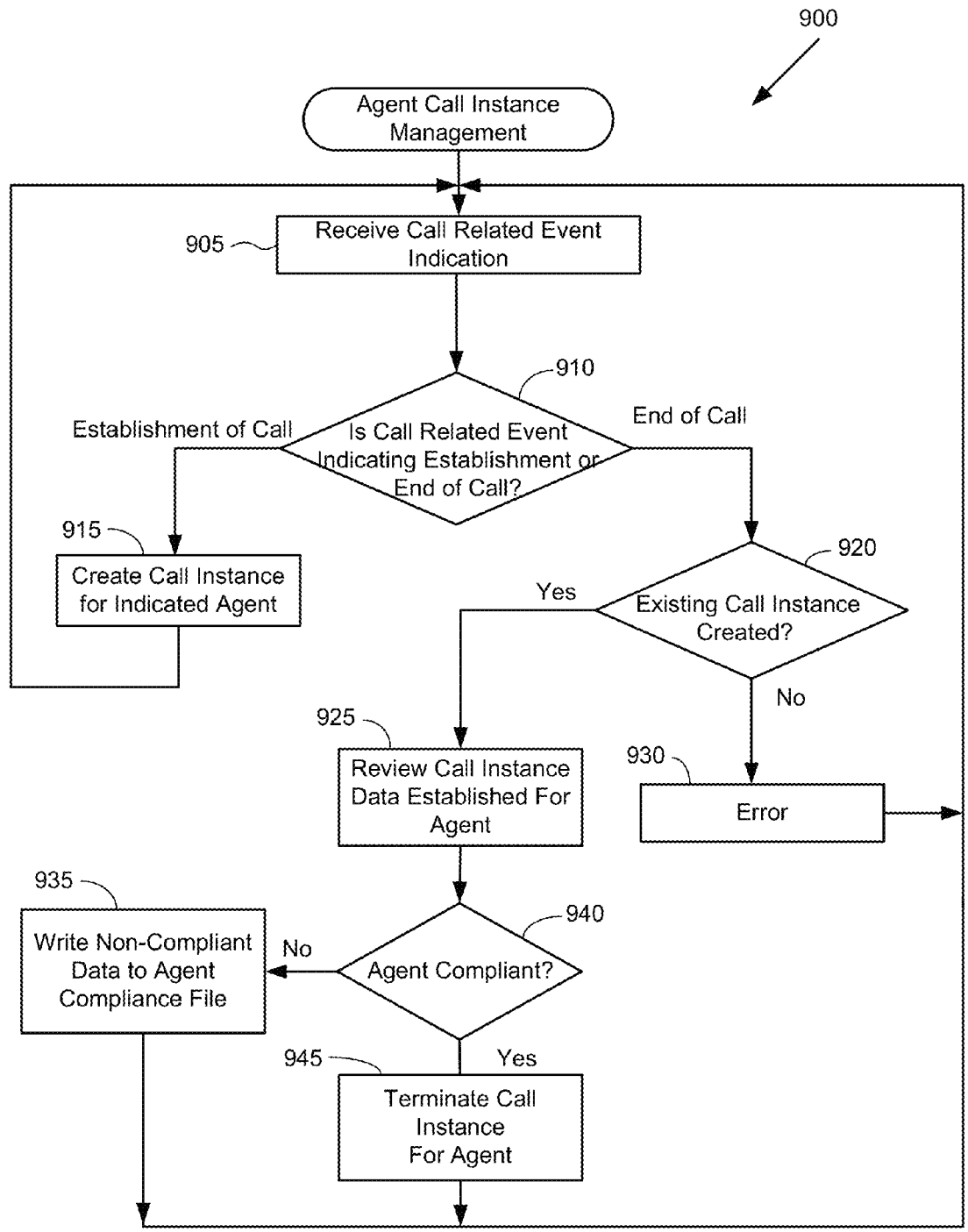
FIG. 9 illustrates one embodiment of a process flow for managing call instances created by an application specific module.

The process 900 in FIG. 9 begins with an ASM receiving an event notification comprising a call related event notification (or simply called a "call related event"). A test is performed to determine whether the call related event indicates a call has been established or has been terminated in operation 910. If the call related event indicates the establishment of a call, then a call instance is created in operation 915. In one embodiment, the call related event notification message includes information that allows the ASM to know call related information such as the campaign and agent involved. The ASM may also know other information, such as the remote party's ANI. This call related information allows the call instance to be readily linked or associated with an agent.

If, in operation 910, the call related event indicates the end of a call, then a test may occur as to whether a call instance was previously created, e.g., is there an existing call instance created that can be ended? If not, then this likely reflects an error condition, as a call that is ended should have been previously established. The appropriate error operations are performed in operation 930. Assuming in the normal mode of operation that there is a call instance found in operation 920, then any generated call instance data is reviewed in operation 925.

Reviewing call instance data involves reviewing any data generated as a result of receiving speech related event notifications (or lack thereof) during the call. This may include data relating to the agent's performance, such as observations, conclusions, or events recorded and associated with that call instance. Call instance data may include data indicating whether a particular topic was discussed, what speech related event notifications were received, whether the agent used the proper company name in the greeting, whether the agent confirmed a telephone number, etc. Call instance data may indicate the agent handled the call in an appropriate manner or that the agent failed to comply with certain requirements. Agent scores, compliance indices, or other data may be generated by the ASM during the call and stored as part of the call instance data. Call instance data may be analyzed at this point using threshold data to determine whether the agent was compliant in operation 940. If the agent is not compliant, then any non-compliant call instance data may be written to an agent compliance file in operation 935, which details the non-compliant condition. If the agent is compliant in operation 940, then the call may simply be terminated in operation 945. In other embodiment, call instance data may be recorded regardless, and compliance may be determined at a later time. The process flow then proceeds from either operation 935 or operation 945 back up to operation 905 where the next call related event indication is received.

The data that may be recorded when a call instance ends may vary and is determined by each ASM. In the embodiment shown in FIG. 9, non-compliant data may be stored in secondary memory (e.g., disk storage) by writing it to an agent file. Other embodiments may also store additional data, such as compliant data (e.g., what the agent did right) or the received speech related event notifications. A number of variations can defined for the process flow after operation 920 as to what data is recorded and how. Each ASM will define the appropriate procedures based on the particular application. In some embodiments, the ASM may not store any call instance data. Rather, the ASM may be configured to merely control other system elements or provide notifications to other components or modules in response to certain conditions. These other components or modules may, in turn, store data relating to call.

FIG. 9 represents a somewhat generic process flow for actions taken in by each ASM in response to call related event indications. Each ASM will typically create a call instance, and this process flow is shown in a somewhat generic manner in FIG. 9. It should be realized that certain modifications to this flow may be required for each specific application. However, segregating the process flow for call related event notifications and speech related event notification is useful for describing the process flow of each ASM and to focus on how the actions are unique to the application.

Figure 10:
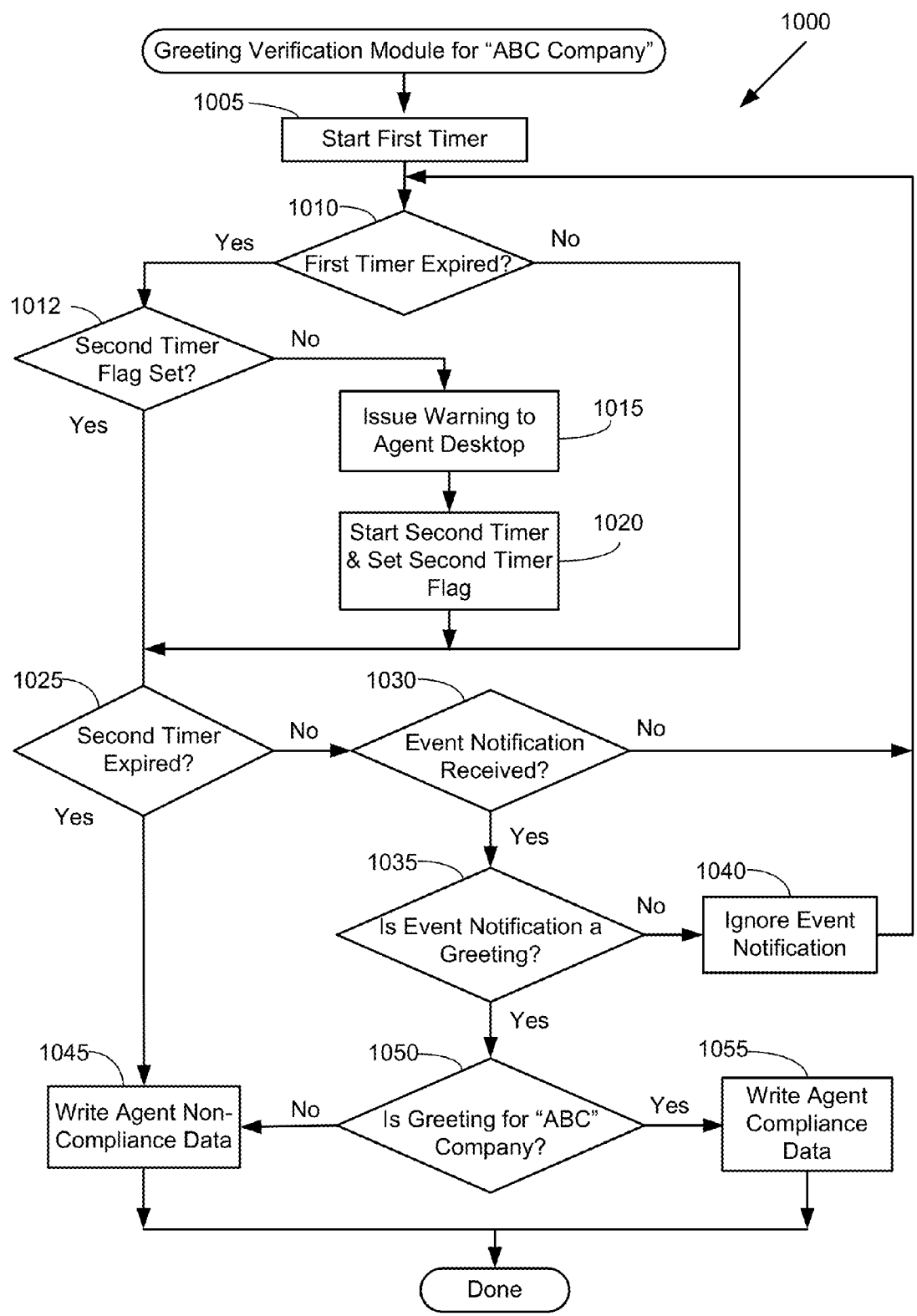
FIG. 10 provides one embodiment of a process flow of an application specific module for managing an agent's greeting.

As evident, the call instance data generated during call and associated processing thereof by the ASM is specific for that particular application. A wide variety of ASMs can be defined for different purposes, and only one application is provided in further detail to illustrate the concepts and technologies herein. The ASM illustrated in FIG. 10 is a "greeting management" application, which monitors the greeting provided by the agent at the beginning of a call. In summary, this ASM determines whether the agent has properly stated the company's name as part of the agent's initial greeting. If the agent has not done so within an initial time period, as defined by a timer starting at the beginning of the call, then a visual warning is provided on the agent's computer screen. If the agent does not then provide the company's name within a second time period, then non-compliant agent data is written to an agent compliance file. Otherwise, data indicating the agent complied with the policy is written to the agent's compliance file. This processing logic for this application is illustrative, as others may define a different logic flow for managing agent greetings.

Turning to FIG. 10, the application processing flow is shown for the agent greeting management application. The process 1000 begins after a call related event indication has lead to creating a call instance. The initial operation in process 1000 is to start a first timer in operation 1005. This timer is used to determine whether the agent has uttered the company's name within this time period at the beginning of a call, after which a warning is provided to the agent. Next, a test is performed in operation 1010 to determine if that first timer has expired. Assume that for the first pass through, the first timer has not expired, and so the process proceeds to operation 1025 where a second timer is checked for expiry. Since the second timer has not been started, it has not expired. This second timer defines a second time period during which if the agent does not mention the company name after being warned after the first time period, a non-compliance condition is recorded.

The process then proceeds to test whether a speech related event notification has been received in operation 1030. Needless to say, each of the event notifications received in this figure are all speech-related event notifications. If no event notification has been received, then the process loops back up to operation 1010. In essence, this process loops as described above and waits for either a speech-related event notification message (in operation 1030) or the expiry of the first timer (in operation 1010).

Assume that a speech-related event notification is received in operation 1030 before the first timer expires. The flow proceeds from operation 1030 to operation 1035, where a test is made to see if the event notification is a greeting. If not, then in operation 1040 the event notification may be ignored. This test may be included to accommodate certain situations where the event handler module forwards an event notification to multiple ASMs. In such cases, it is possible for the ASM to then receive an event notification that is irrelevant and may be discarded. For sake of completion, this operation is shown in FIG. 10, though in the normal use case the event notification is presumed to be relevant.

Assuming the event notification indicates a greeting was detected in operation 1035, a test is performed in operation 1050 to determine if the greeting included the name of "ABC" company. If "yes," then in operation 1055 agent compliance data is written to memory in the call instance, if not then the operation proceeds to operation 1045 where agent non-compliance data is written to memory of the call instance (alternatively, data could written to a file). The process is completed. Thus, if the agent states the company's name within the time period defined by the first timer, the agent has complied with the greeting policy.

It should be noted that the operations involving 1030, 1035, and 1050 may vary depending on how the keywords, keyword sets, and routing tables are established. For example, a single test may ascertain the presence of a phrase with the company's name as opposed to having two distinct tests 1035, 1050.

If no such event notification is received within the first time period in operation 1010, then the process flow proceeds from operation 1010 to operation 1012 where a test occurs as to whether a second timer has been set. If the second timer was not set, then a warning is issued to the agent's desktop in operation 1015, which may provide a visual reminder or warning to the agent to provide the company's name. A second timer may be started in operation 1020 along with setting a second timer flag.

If the first timer has expired in operation 1010, and the second timer flag has been set in operation 1012, then a test occurs to see if the second timer has expired in operation 1025. If the second time has expired in operation 1025, then non-compliant data is written for the agent in operation 1045. Otherwise, in operation 1025 if the second timer has not expired, then the process flow continues to operation 1030 as described above. This process reflects that the agent who does not indicate the proper greeting is warned once after the first timer expires, after which a second timer is started. If the agent does not correct the problem before the second timer expires, then the agent has not complied with the requirement and a non-compliance condition is recorded.

The process flow is one embodiment of a greeting management application, and those skilled in the art may develop other variations for managing the agent's greeting. For example, the process could avoid providing a warning and merely detect whether the agent provided the company name within the first timer. In another embodiment, a counter could be maintained in an agent compliance file indicating how many calls the agent was deficient. In another embodiment, a warning could be provided to the agent, but no compliance data is maintained. In another embodiment, a notification could be sent via email, text or other means to the agent's supervisor. In another embodiment, a score associated with the non-compliance event could be generated, displayed to the agent, and stored in a file.

As illustrated in FIG. 10, the ASM module receives the event notification data and, in turn, generates agent compliance data reflecting agent performance. Further, the ASM module also provides a warning or reminder to the agent that the company name should be mentioned. A graphical user interface ("GUI") illustrating one embodiment of what information an ASM may present to the agent using the agent's computer workstation is shown in FIG. 11.

Figure 11:
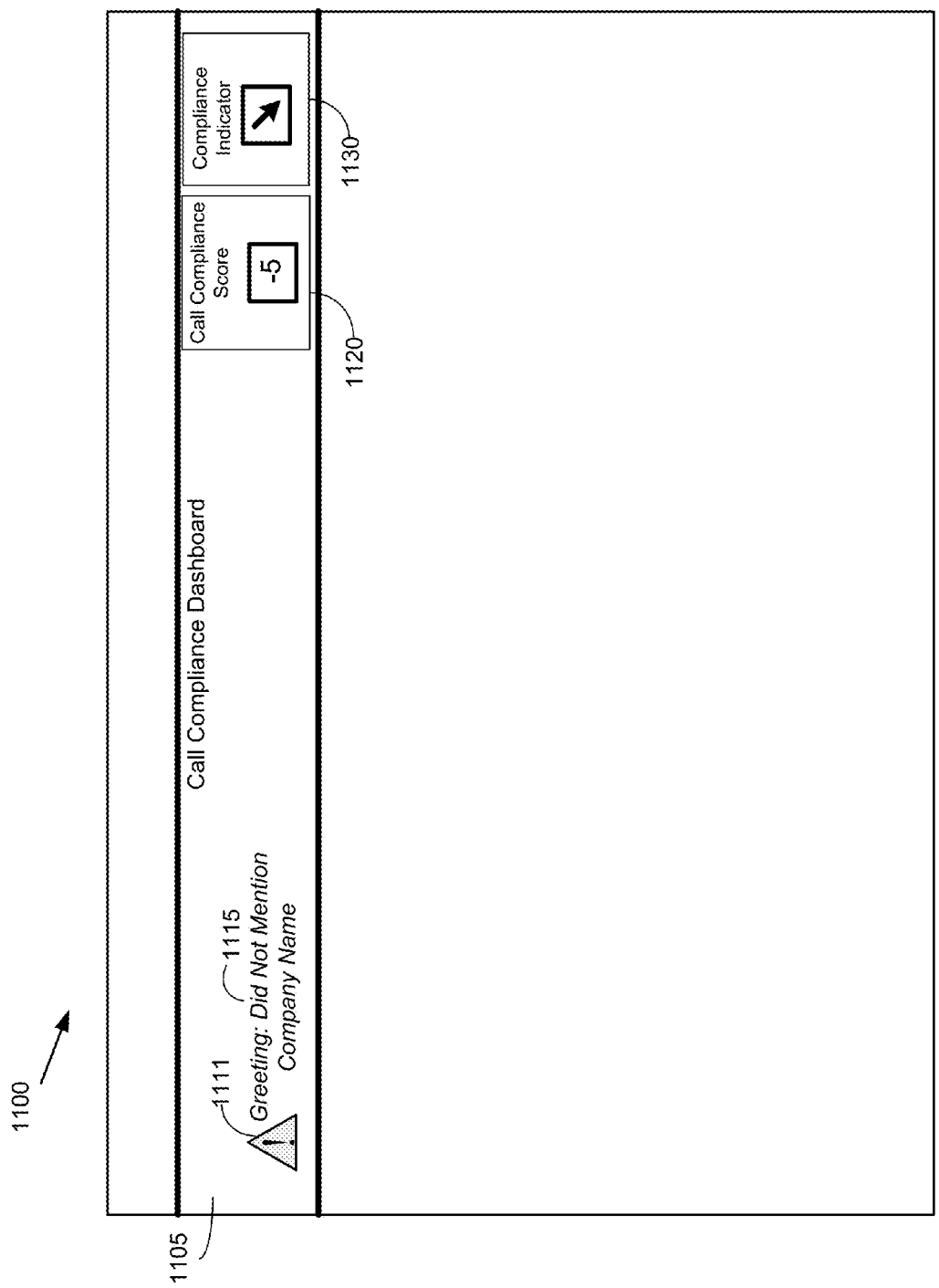
FIG. 11 illustrates one embodiment of a dashboard indicator provided by an application specific module to an agent's workstation.

Turning to FIG. 11, a display window 1100 shows a call compliance dashboard portion 1105 that may display various types of real-time call related information to an agent. One such indication could be an icon 1111 warning the agent of a condition and an associated text message 1115 that explains the condition. Consistent with the example provided in FIG. 10, the text message 1115 indicates that the greeting did not mention the company name. Various colors, shapes, and symbols may be used to obtain the agent's attention during the call. For example, a numerical score can be attached to the particular compliance condition being monitored. A call compliance score 1120 can be provided that indicates positive points when the agent properly handles a condition, or negative points if the agent did not. Points can be indicated on a per-call basis as well as a running indicator of the cumulative point value acquired by the agent during the shift. The points can be accumulated into an agent's account and, in some embodiments, the points may be a form of virtual currency or type of token that the agent can use to bid for scheduling events. Other icons 1130 may reflect an overall compliance rating for the agent. In this embodiment, a downward arrow reflects a net negative score. A horizontal arrow may reflect a neutral score, and an upward arrow may reflect a positive score. Other forms of indicators, icons, or warnings can be provided to the agent in real time.

In addition to providing real-time, call specific indications to the agent on the agent's desktop computing display, real-time dashboard summaries and/or notifications can be provided to a supervisor. Further, reports can be generated for a supervisor providing summary information in tabular or spreadsheet form for display on the supervisor's computer or printed out. These reports may be generated by a management module that communicates with the various ASMs or that collects data from various agent data files that the ASMs populate.

One embodiment of one such a report summary is illustrated in FIG. 12. In FIG. 12, a display 1200 of a real-time speech analytics agent scoring report. The information in this embodiment is presented in a spreadsheet format with the first column 1202 providing the agent's name. A second column 1204 may provide the time/date information for each call. A third column 1206 provides a positivity score for each call. A fourth column 1208 provides a compliance score and a fifth column 1210 provides the number of alerts issued to the agent. In other embodiments, a current average value may be displayed for all calls taken during the shift for each agent and a life-of-campaign value may also be presented. In addition, each agent's average scores can be compared to a corresponding average from among all agents on the shift or in the contact center. This allows the supervisor to ascertain whether the agent is improving performance, performing better than their peers, or repeating mistakes.

Figure 13:
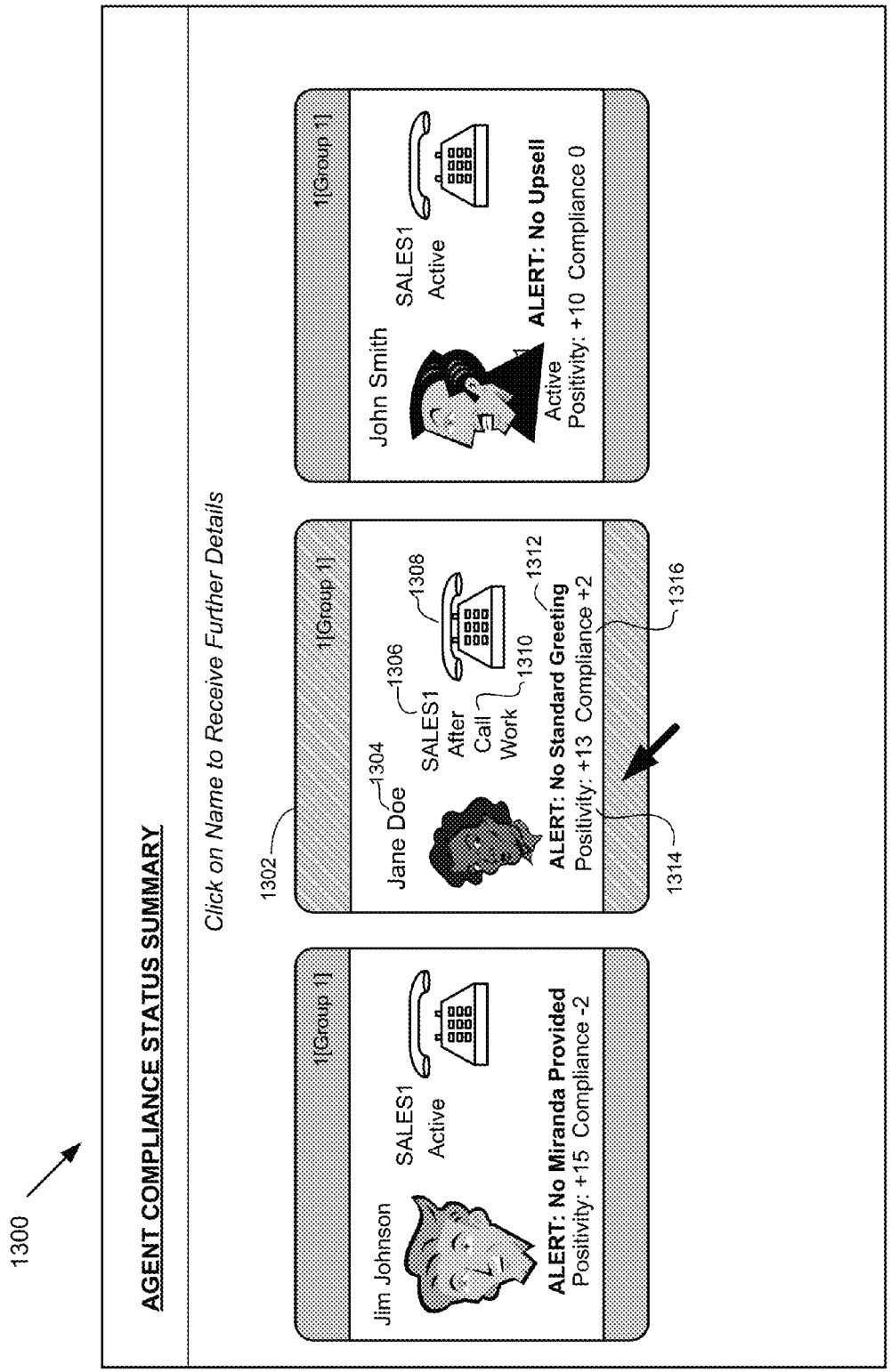
FIG. 13 illustrates one embodiment of a real time dashboard provided to a supervisor.

Another form of feedback that may be presented to the supervisor is a real-time speech analytics dashboard for each of the agents on a shift. One embodiment to illustrate this capability is shown in FIG. 13. In this embodiment, the supervisor's computing screen presents a window 1300 that shows icons of each assigned agent with various agent related information. For example, an icon 1302 may indicate the name 1304 of the agent along with a picture or other image of the agent. The name of the campaign 1306 that the agent is currently working on is shown, along with the current work state 1310. The agent's work state can reflect that the agent is active on a call, performing after-call work, waiting for a call, logged off, on break, etc. Another icon 1308 can indicate whether the agent is currently speaking with a remote party. Alert information 1312 may be provided that summarizes the latest or most important compliance condition for the current call. Further, values for a current call or shift average can be provided. In this embodiment, a positivity score 1314 representing a cumulative average is provided, along with a per-call compliance score 1316. In other embodiments, the positivity score may represent a current per-call value, and the compliance score may represent a cumulative average. Further information about the agent's status and compliance history may be obtained by clicking on a particular element, or by simply hovering the cursor over the icon. Doing so may provide a detailed call-by-call history and status information for that agent. In some embodiments, the supervisor can select the icon and monitor the current call that the agent is involved with.

Other information may be provided in these reports as shown in FIGS. 12 and 13. The exact information provided can be tailored for each contact center, with different levels of information. Distinguishing visual indications can be used to highlight or identify agents not adhering to contact center policies. For example, real-time messages can be generated to the supervisor in the form of emails, texts, instant messages or other notifications indicating that a certain agent is currently not adhering to a policy of condition on a call. In other embodiments, colors associated with the icons 1302 can change, such using red to warn of severe non-compliance agent performance.

Exemplary Computer Processing Device

Figure 14:
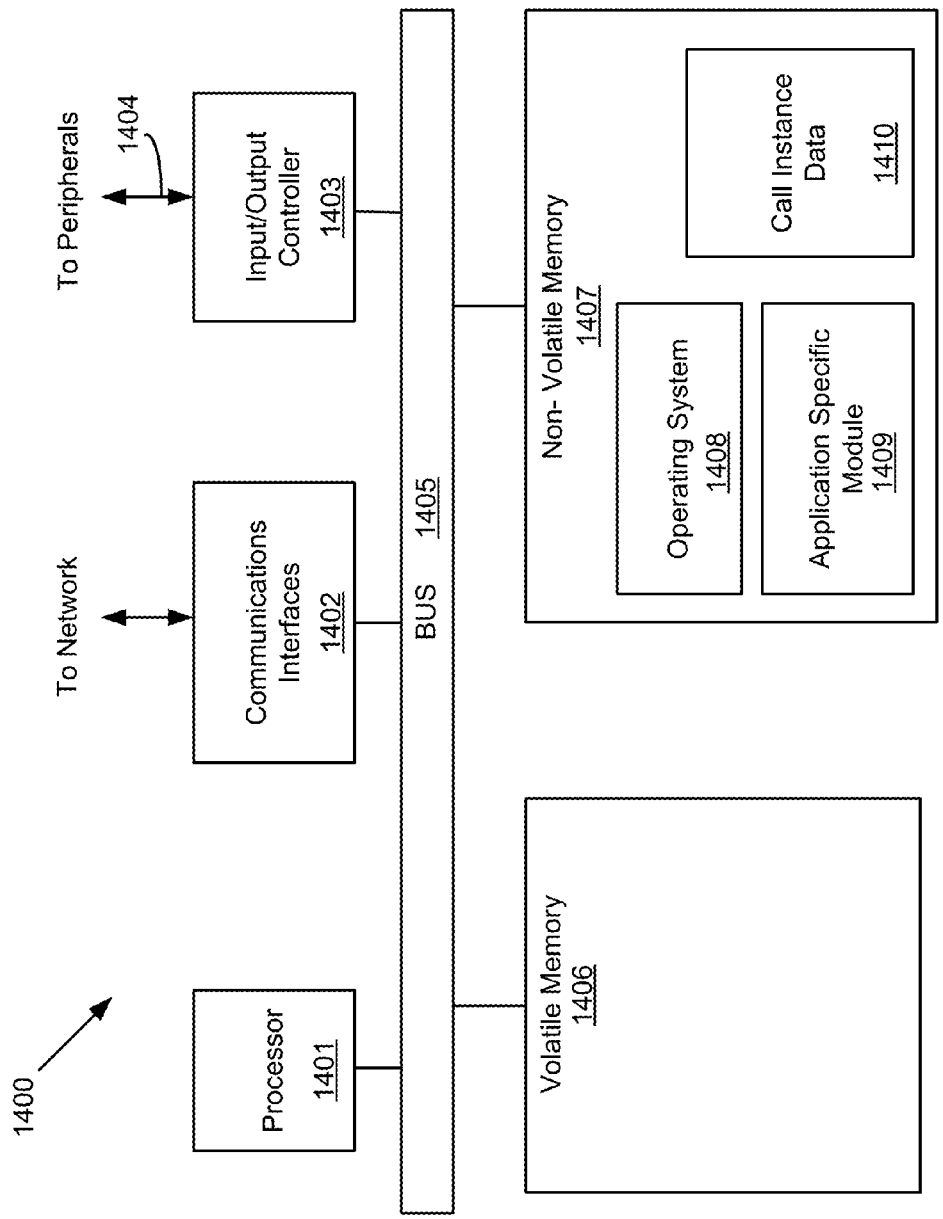
FIG. 14 illustrates one embodiment of a computer processing system for providing the concepts and technologies disclosed herein.

FIG. 14 is an exemplary schematic diagram of a computer processing system 1400 that may be used in embodiments of various architectures for the speech analytics system 121 or the application specific processing system 180 of FIG. 1. In addition, the computer processing system 1400 could also represent some other contact center system that executes SAM 220, the event handler module 250, or an ASM 260. In general, the term "computer processing system" may be exemplified by, for example, but without limitation: a personal computer, server, desktop computer, tablets, smart phones, notebooks, laptops, distributed computing systems, servers, blades, gateways, switches, and the like, as well as any combination of devices or entities adapted to perform the functions described herein.

As shown in FIG. 14, the processing system 1400 may include one or more processors 1401 that may communicate with other elements within the processing system 1400 via a bus 1405. The processor 1401 may be implemented as one or more complex programmable logic devices ("CPLD"), microprocessor, integrated circuit ("IC") based microprocessor, a von-Neumann architecture-based digital computer, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1400 may also include one or more communications interfaces 1402 for communicating data via a data network, such as a local network, with various external devices, including the various components or systems shown in FIG. 1. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1403 may also communicate with one or more input devices, peripherals, components or systems using an interface 1404 such as, but not limited to: a keyboard, a mouse, a touch screen/display input, microphone, pointing device, etc. The input/output controller 1403 may also communicate with output devices or peripherals, such as displays, printers, speakers, headsets, banner displays, etc. These may be used, in part, to receive administrator input, including for receiving real-time or summary data generated by an ASM.

The processor 1401 may be configured to execute instructions stored in volatile memory 1406, non-volatile memory 1407, or other forms of computer readable storage media accessible to the processor 1401. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1407 may store program code and data, which also may be loaded into the volatile memory 1406 at execution time. For example, the non-volatile memory 1407 may store one or more modules, such as the ASM module 1409 that may implement and perform the above-mentioned process flows containing instructions for performing the process and/or functions associated with the technologies disclosed herein, as well as operating system code 1408. The ASM module 1409 may also manage application specific data such as the call instance data 1410. The memory may store other modules, such as the scheduling module (not shown) and scheduling data (not shown). The data in the non-volatile memory may be copied (not shown) in the volatile memory 1406 at run time. The volatile memory 1406 and/or non-volatile memory 1407 may be used to store other information including, but not limited to: records, applications, programs, scripts, source code, object code, byte code, compiled code, interpreted code, machine code, executable instructions, or the like. These may be executed or processed by, for example, the processor 1401 and may form a part of, or may interact with, the ASM module 1409.

Although FIG. 14 illustrates a processing system 1400 executing an ASM module and associated call instance data 1410, the same architecture could be used for executing other modules and related data as disclosed herein.

The technologies described herein may be implemented in various ways, including as computer program products comprising memory storing instructions causing a processor to perform the operations associated with the above technologies. The computer program product may comprise a non-transitory, tangible computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). The computer readable storage media includes all the above tangible identified computer readable media (including volatile and non-volatile media), but does not include a transitory or propagating signal; nor does the tangible medium encompass any non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

The examples for illustrating the concepts and the technologies herein have focused on certain applications in a contact center (such as monitoring an agent greeting), but could be easily applied for other specific applications. For example, the above architecture can accommodate application specific modules which pertain to:
  managing a caller requesting their telephone number be added an enterprise, state, or federal do not call list;
  obtaining express consent for the caller to authorize autodialed calls to their wireless number, including controlling recording of the audio thereof;
  verifying an agent has properly authenticated a call in a healthcare services context so that personal health information may be provided to the call;
  detecting and managing angry callers;
  managing an agent's interaction on a debt collection call, including when the remote party indicates that they have filed for bankruptcy;
  controlling when and how a call may be record based on consent provided by the called party;
  confirming a telephone number provided by a caller for various reasons, including updating, adding, or deleting a contact number;
  ensuring an agent properly indicates a brand name to a caller; and
  properly verifying information about the remote party, including age, address, customer number, etc.

It should become apparent to one skilled in the art in light of the present disclosure, that a number of applications may utilize the process flows discussed herein. For example, a variety of ASMs may use the ability of receiving an initial indication of a keyword detected in a party's speech and start a timer that is stopped upon receiving a subsequent second indication of detection of another keyword. This process provides a capability of determining when a subsequent keyword should be detected by the agent after a first keyword, and if it is not detected within a certain time period, then it can be ascertained that the agent did not properly adhere to a regulation, policy, or a best practice identified to the agent. Thus, upon expiry of the timer, the process defined by the ASM may cause any one of a number of actions can be taken, such as informing or reminding the agent or supervisor of the particular audio context, and/or providing further information to the agent or supervisor regarding how to handle the particular audio context.

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for processing data received from a speech analytics system ("SAS") in an application specific processing system ("ASPS"), comprising:
  receiving a first event notification message at an interface of the ASPS, the first event notification message indicating establishment of a call involving a call handler and the speech analytics system, wherein the call is streamed using multiple audio streams to the speech analytics system;
  forwarding the first event notification message by the ASPS to a plurality of application specific modules ("ASMs") executing in the ASPS, wherein each ASM generates a call instance associated with the call in response to receiving the first event notification message;
  receiving a second event notification message at the interface of the ASPS from the SAS, the second event notification message indicating detection by the SAS of a keyword in one of the multiple audio streams of the call, wherein the second event notification message comprises a call identifier of the call and at least one of a keyword identifier indicating the keyword and a keyword set identifier that includes the keyword;
  forwarding the second event notification message by the ASPS to at least one of the ASMs; and
  processing the second event notification message by the at least one of the ASMs resulting in generating compliance data stored in a memory of the ASPS.

2. The method of claim 1, wherein at least two ASMs receive the second event notification message and at least one of the two ASMs does not generate any compliance data.

3. The method of claim 1, wherein a routing table is used to identify the at least one of the ASMs to which the second event notification message is forwarded.

4. The method of claim 3, wherein either the keyword identifier or the keyword set identifier is used in conjunction with the routing table to identify the at least one of the ASMs.

5. The method of claim 1, further comprising:
  receiving a third event notification message at the interface of the ASPS from the SAS comprising the call identifier, the third event notification message indicating the call has ended; and
  forwarding the third event notification message by the ASPS to the plurality of ASMs.

6. The method of claim 5, wherein each of the plurality of ASMs terminates each respective call instance associated with the call in response to receiving the third event notification message.

7. The method of claim 6, wherein in response to ending the call at least one of the ASMs stores the compliance data in a file.

8. The method of claim 1, wherein in response to receiving the second event notification message the at least one of the ASMs transmits a message to a computer used by a contact center agent causing an icon to be displayed on the computer to the contact center agent.

9. The method of claim 8, wherein in the message further comprises text that is displayed along with the icon.

10. The method of claim 8, wherein a timer is started in the ASM in conjunction with transmitting the message to the computer used by the contact center agent.

11. The method of claim 1, further comprising:
starting a timer in one of the ASMs upon receiving the first event notification message; and
stopping the timer upon receiving the second event notification message.

12. The method of claim 1, wherein second event notification message further indicates that the keyword was detected in one of the audio streams conveying audio of a contact center agent.

13. The method of claim 12, wherein the second event notification message further indicates a party identifier indicating the keyword is associated with the contact center agent.

14. A non-transitory computer readable medium comprising instructions that when executed by a processor, cause the processor to:
receive a first event notification message indicating establishment of a call involving a call handler and a speech analytics system ("SAS"), wherein the call is streamed using multiple audio streams to the SAS;
forward the first event notification message to a plurality of application specific modules ("ASMs") executed by the processor, wherein each one of the plurality of ASMs generates a call instance associated with the call in response to receiving the first event notification message;
receive a second event notification message indicating detection by the SAS of a keyword in one of the multiple audio streams of the call, wherein the second event notification message comprises a call identifier of the call and at least one of a keyword identifier indicating the keyword and a keyword set identifier that includes the keyword; and
forward the second event notification message to at least one of the plurality of ASMs wherein the at least one of the plurality of ASMs results in generating compliance data stored in a memory, the compliance data related to performance of a contact center agent.

15. The non-transitory computer readable medium of claim 14, wherein the instructions when executed further cause the processor to:
use at least one of the keyword identifier indicating the keyword and the keyword set identifier that includes the keyword in conjunction with a routing table to identify the at least one of the plurality of ASMs to receive the second event notification message.

16. The non-transitory computer readable medium of claim 14, wherein the instructions when executed further cause the processor to:
forward the first event notification message to the plurality of ASMs based on the first event notification message comprising a call related event notification message.

17. The non-transitory computer readable medium of claim 14, wherein the instructions when executed further cause the processor to:
receive a third event notification message comprising a call related event notification message from the SAS indicating the call has ended; and
forward the third event notification message to the plurality of ASMs based on the first event notification message comprising a call related event notification message.

18. A non-transitory computer readable medium comprising instructions that when executed by a processor, further cause the processor to:
receive a first event notification message comprising a call related event notification, the first event notification message indicating establishment of a call involving at least two audio streams between a call handler and a speech analytics system ("SAS"), the first event notification message comprising a call identifier associated with the call;
establish a call instance comprising a data structure associated with the call identifier, wherein the data structure stores the call identifier;
receive a second event notification message indicating detection by the SAS of a keyword in one of the at least two multiple audio streams of the call, wherein the second event notification comprises the call identifier and a party identifier indicating a party associated with detection of the keyword, and an indication of the keyword;
initiate a timer in response to receiving the second event notification message;
store the indication of the keyword in the call instance in response to receiving the second event notification;
transmit a message to a computer of the contact center agent in response to receiving the second event notification message, the message causing a visual indication to be displayed on the computer associated with detection of the audio context; and
upon expiry of the timer and wherein a third event notification message is not received prior to expiry of the timer, write at least a portion of the data structure of the call instance to a file.

19. The non-transitory computer readable medium of claim 18, wherein the visual indication is text.

* * * * *